(12) United States Patent
Yang

(10) Patent No.: US 11,893,766 B2
(45) Date of Patent: Feb. 6, 2024

(54) NEURAL NETWORK SYSTEM AND OPERATING METHOD THEREOF

(71) Applicant: SAMSUNG ELECTRONICS CO., LTD., Suwon-si (KR)

(72) Inventor: Seungsoo Yang, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 627 days.

(21) Appl. No.: 17/031,039

(22) Filed: Sep. 24, 2020

(65) Prior Publication Data
US 2021/0174116 A1 Jun. 10, 2021

(30) Foreign Application Priority Data

Dec. 9, 2019 (KR) .................. 10-2019-0162881

(51) Int. Cl.
*G06V 10/20* (2022.01)
*G06T 7/11* (2017.01)
(Continued)

(52) U.S. Cl.
CPC ............ *G06V 10/255* (2022.01); *G06F 18/22* (2023.01); *G06T 7/11* (2017.01); *G06V 10/764* (2022.01);
(Continued)

(58) Field of Classification Search
CPC ...... G06F 18/22; G06V 10/82; G06V 10/255; G06V 10/764; G06V 2201/10; G06T 7/11; G06T 2207/30252; G06T 2207/20084
See application file for complete search history.

(56) References Cited

U.S. PATENT DOCUMENTS 7,139,999 B2 11/2006 Bowman-Amuah
7,721,303 B2 5/2010 Alves de Moura et al.
(Continued)

FOREIGN PATENT DOCUMENTS

KR 10-1916347 B1 11/2018

OTHER PUBLICATIONS

Nabati R, Qi H. RRPN: Radar Region Proposal Network for Object Detection in Autonomous Vehicles. arXiv preprint arXiv: 1905. 00526. May 1, 2019. (Year: 2019).*

(Continued)

*Primary Examiner* — Vu Le
*Assistant Examiner* — Tracy Mangialaschi
(74) *Attorney, Agent, or Firm* — Sughrue Mion, PLLC

(57) ABSTRACT

A neural network system, includes: a processor configured to detect a plurality of object candidates included in a first image, generate metadata corresponding to the plurality of object candidates based on the first image, and set data processing orders of the plurality of object candidates based on the metadata; and at least one resource configured to perform data processing with respect to the plurality of object candidates. The processor is configured to sequentially provide pieces of information related to data processing of the plurality of object candidates to the at least one resource according to the set data processing orders, and the at least one resource is configured to sequentially perform data processing with respect to the plurality of object candidates according to an order in which a piece of information related to data processing of each of the plurality of object candidates is received.

20 Claims, 14 Drawing Sheets

(51) Int. Cl.
  *G06F 18/22* (2023.01)
  *G06V 10/764* (2022.01)
  *G06V 10/82* (2022.01)

(52) U.S. Cl.
  CPC .... *G06V 10/82* (2022.01); *G06T 2207/20084* (2013.01); *G06T 2207/30252* (2013.01)

(56) References Cited

U.S. PATENT DOCUMENTS

| | | | |
|---|---|---|---|
| 7,865,888 B1 | 1/2011 | Qureshi et al. | |
| 8,432,492 B2 | 4/2013 | Deigmoeller et al. | |
| 8,848,055 B2 | 9/2014 | Lee | |
| 9,021,355 B2 | 4/2015 | Salyards et al. | |
| 9,049,259 B2 | 6/2015 | Rathod | |
| 9,122,711 B1 | 9/2015 | Nicolini et al. | |
| 9,152,707 B2 | 10/2015 | Libich | |
| 9,671,777 B1 | 6/2017 | Aichele et al. | |
| 9,672,431 B2 | 6/2017 | Fernandez et al. | |
| 9,922,124 B2 | 3/2018 | Rathod | |
| 10,147,163 B2 | 12/2018 | Welinder et al. | |
| 10,210,907 B2 | 2/2019 | Puri et al. | |
| 2015/0178953 A1 | 6/2015 | Gao et al. | |
| 2016/0005171 A1 | 1/2016 | Watanabe et al. | |
| 2017/0169313 A1 | 6/2017 | Choi et al. | |
| 2017/0206431 A1 | 7/2017 | Sun et al. | |

OTHER PUBLICATIONS

Fattal, Ann-Katrin, et al. "Saliency-guided region proposal network for CNN based object detection." 2017 IEEE 20th International Conference on Intelligent Transportation Systems (ITSC). IEEE, 2017. (Year: 2017).*

Pan X, Chiang SL, Canny J. Label and sample: efficient training of vehicle object detector from sparsely labeled data. arXiv preprint arXiv:1808.08603. Aug. 26, 2018. (Year: 2018).*

Cai Z, Vasconcelos N. Cascade R-CNN: High Quality Object Detection and Instance Segmentation. arXiv preprint arXiv: 1906.09756. Jun. 24, 2019. (Year: 2019).*

* cited by examiner

NEURAL NETWORK SYSTEM AND OPERATING METHOD THEREOF

CROSS-REFERENCE TO THE RELATED APPLICATION

This application claims priority to Korean Patent Application No. 10-2019-0162881, filed on Dec. 9, 2019, in the Korean Intellectual Property Office, the disclosure of which is herein incorporated by reference in its entirety.

BACKGROUND

1. Field

Example embodiments relate to a neural network system and an operating method thereof, and more particularly, to a neural network system and an operating method thereof in which data processing for object candidates included in an image is performed in units of objects.

2. Description of Related Art

An artificial neural network (ANN) refers to a computational architecture using a biological brain as a model. Deep learning, machine learning, etc., may be implemented based on an ANN. Due to the recent rapid increase in a computational amount to be processed using an ANN, there is a need for efficiently performing computational processing using the ANN.

SUMMARY

One or more example embodiments provide a neural network system and an operating method thereof, in which the neural network system sets processing orders of a plurality of object candidates included in an image based on metadata of the plurality of object candidates, performs object recognition with respect to the plurality of object candidates according to the set orders, and executes a task corresponding to an object recognition result in units object. Accordingly, a bottleneck phenomenon caused by consecutive object recognition operations may be prevented, data processing for an object candidate having high importance may be preferentially performed, and thus, efficiency in data processing for object recognition may be improved.

According to an aspect of an example embodiment, there is provided a neural network system, including: a processor configured to detect a plurality of object candidates included in a first image, generate metadata corresponding to the plurality of object candidates based on the first image, and set data processing orders of the plurality of object candidates based on the metadata; and at least one resource configured to perform data processing with respect to the plurality of object candidates, wherein the processor is further configured to sequentially provide pieces of information related to data processing of the plurality of object candidates to the at least one resource according to the set data processing orders of the plurality of object candidates, and the at least one resource is further configured to sequentially perform data processing with respect to the plurality of object candidates according to an order in which a piece of information related to data processing of each of the plurality of object candidates is received.

According to an aspect of an example embodiment, there is provided an operating method of a neural network system, the operating method including: detecting a plurality of object candidates included in a first image; performing first object recognition with respect to a first object candidate among the plurality of object candidates; executing a first task corresponding to a result of the first object recognition; performing second object recognition with respect to a second object candidate among the plurality of object candidates, upon completion of the first task; and executing a second task corresponding to a result of the second object recognition.

According to an aspect of an example embodiment, there is provided an electronic device, including: a sensor configured to obtain data about a vicinity of the electronic device and output a first image based on the obtained data; at least one resource configured to perform object recognition with respect to the first image; a memory configured to store programs; and a processor configured to read the programs and operate as instructed by the programs, to detect a plurality of object candidates in the first image, generate metadata of the plurality of object candidates based on the first image, and provide, to the at least one resource, information about a first object candidate, that is selected based on the metadata among the plurality of object candidates, wherein the at least one resource is further configured to perform first object recognition with respect to the first object candidate and execute a first task corresponding to a result of the first object recognition.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
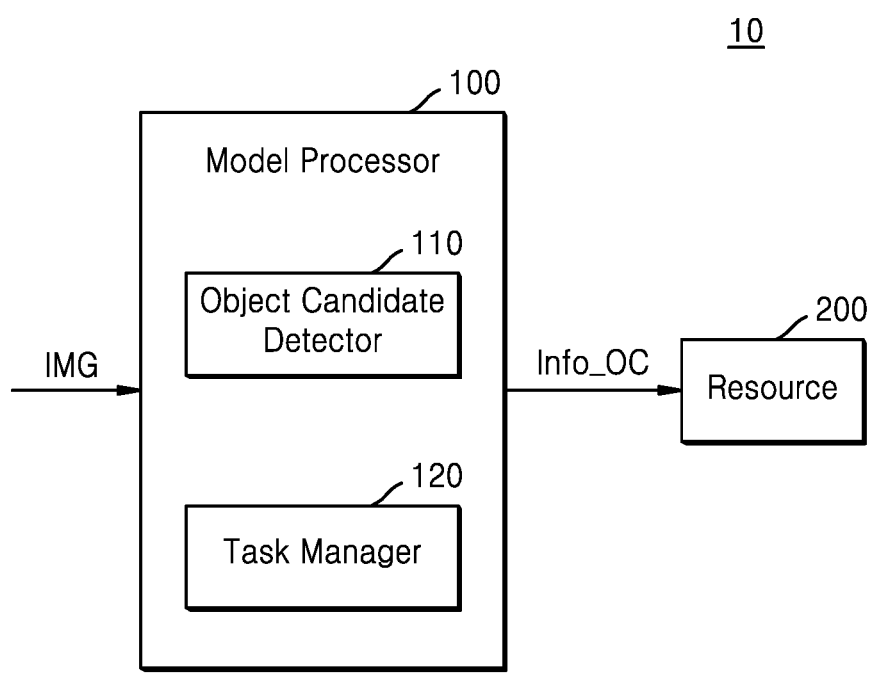
FIG. 1 is a block diagram of a neural network system according to an example embodiment.

Hereinafter, example embodiments will be described in detail with reference to the accompanying drawings. The scope of the disclosure, however, should not be construed as limited to the example embodiments set forth herein. Like reference numerals in the drawings refer to like elements throughout the disclosure.

FIG. 1 is a block diagram of a neural network system according to an example embodiment. Referring to FIG. 1, a neural network system 10 may include a model processor 100 and a resource 200. The model processor 100 may include an object candidate detector 110 and a task manager 120.

The neural network system 10 may perform neural network-based neural tasks based on various neural networks. The neural network may include, but not limited to, various types of neural network models, such as a convolution neural network (CNN) such as GoogLeNet, AlexNet, ResNet, VGG Network, etc., a region with a CNN (R-CNN), a fast R-CNN, a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a full convolutional network, a long short-term memory (LSTM) network, a generative adversarial network (GAN), Inception V3 (IV3), a classification network, etc. The neural network performing a task may include sub neural networks which may be implemented with homogeneous or heterogeneous neural network models.

The neural network system 10 may receive an image IMG from outside and perform data processing with respect to the received image IMG. In an example embodiment, the neural network system 10 may perform data processing with respect to the received image IMG by using a neural network model. In an example embodiment, the neural network system 10 may detect a plurality of object candidates included in the received image IMG by using a neural network model such as an RPN, an R-CNN, a fast R-CNN, etc., perform object recognition with respect to the plurality of object candidates, and execute a task corresponding to a recognition result.

The model processor 100 may include the object candidate detector 110 and the task manager 120. Components included in the model processor 100 may be implemented with software and a neural network platform such as an evolutionary deep network (EDEN), etc. In another example, the components included in the model processor 100 may be implemented with hardware such as an electronic circuit. In an example embodiment, the model processor 100 may be implemented with a framework of a neural network.

The object candidate detector 110 may receive the image IMG from outside and analyze the received image IMG, and as a result, detect the plurality of object candidates included in the image IMG. An object candidate may refer to a region where a probability of an object of interest existing in the region of the image IMG is high. The object candidate may refer to a region of interest (RoI). In an example embodiment, the object candidate detector 110 may detect the plurality of object candidates included in the image IMG by using a neural network model such as an RPN, etc. The object candidate detector 110 may provide the detected plurality of object candidates to the task manager 120.

The task manager 120 according to the disclosure may receive the plurality of object candidates and set a data processing order for the plurality of object candidates. In an example embodiment, the task manager 120 may set the data processing order for the plurality of object candidates, according to priorities of the plurality of object candidates. The task manager 120 may provide information Info OC related to data processing of the plurality of object candidates according to the set data processing order. For example, the task manager 120 may provide information related to data processing of a first object candidate having a preceding order among the plurality of object candidates of the image IMG to the resource 200, and when the task manager 120 receives a response indicating completion of execution of a task for the first object candidate from the resource 200, the task manager 120 may provide information related to data processing of a second object candidate of a next order to the resource 200.

The resource 200 may include a computation resource capable of performing computation based on data received from the task manager 120. For example, the resource 200 may include various computation processing devices such as a central processing unit (CPU), a graphics processing unit (GPU), an application processor (AP), a digital signal processor (DSP), a field-programmable gate array (FPGA), a neural network processing unit (NPU), an electronic control unit (ECU), an image signal processor (ISP), etc. The resource 200 may include a plurality of computation resources that are homogeneous or heterogeneous according to an example embodiment. For example, the resource 200 may include a first resource (not shown) and a second resource (not shown) that are NPUs or a first resource (not shown) that is an NPU and a second resource (not shown) that is a GPU.

The resource 200 according to the disclosure may perform data processing with respect to the plurality of object candidates in an order in which information related to data processing of the plurality of object candidates is received from the task manager 120. In an example embodiment, the resource 200 may perform object recognition with respect to the plurality of object candidates in an order in which the information related to data processing of the plurality of object candidates is received, and execute a task corresponding to an object recognition result. The disclosure is not limited thereto, and data processing may include a separate computation in addition to object recognition and may include one computation or three or more computations.

The resource 200 according to the disclosure may perform data processing with respect to the plurality of object candidates in a unit of an object candidate. More specifically, when there are the plurality of object candidates and a plurality of computation operations required for data processing for one object candidate, the resource 200 may perform computation operations with respect to a next object candidate after completion of the computation operations for the one object candidate. For example, when the resource 200 first receives the information related to data processing of the first object candidate from the task manager 120 and then receives the information related to data processing of the second object candidate from the task manager 120, the resource 200 may perform first object recognition with respect to the first object candidate and execute a first task corresponding to a result of the first object recognition, and perform second object recognition with respect to the second object candidate and execute a second task corresponding to a result of the second object recognition.

The neural network system 10 according to the disclosure may set an order according to the priorities of the plurality of object candidates included in the image, perform object recognition for the plurality of object candidates according to the set data processing order, and perform an object recognition and a task corresponding to the object recognition result in a unit of an object according to the set data processing order. Accordingly, a bottleneck phenomenon caused by consecutive object recognition operations may be prevented and data processing for an object candidate having a high importance may be preferentially performed.

Figure 2:
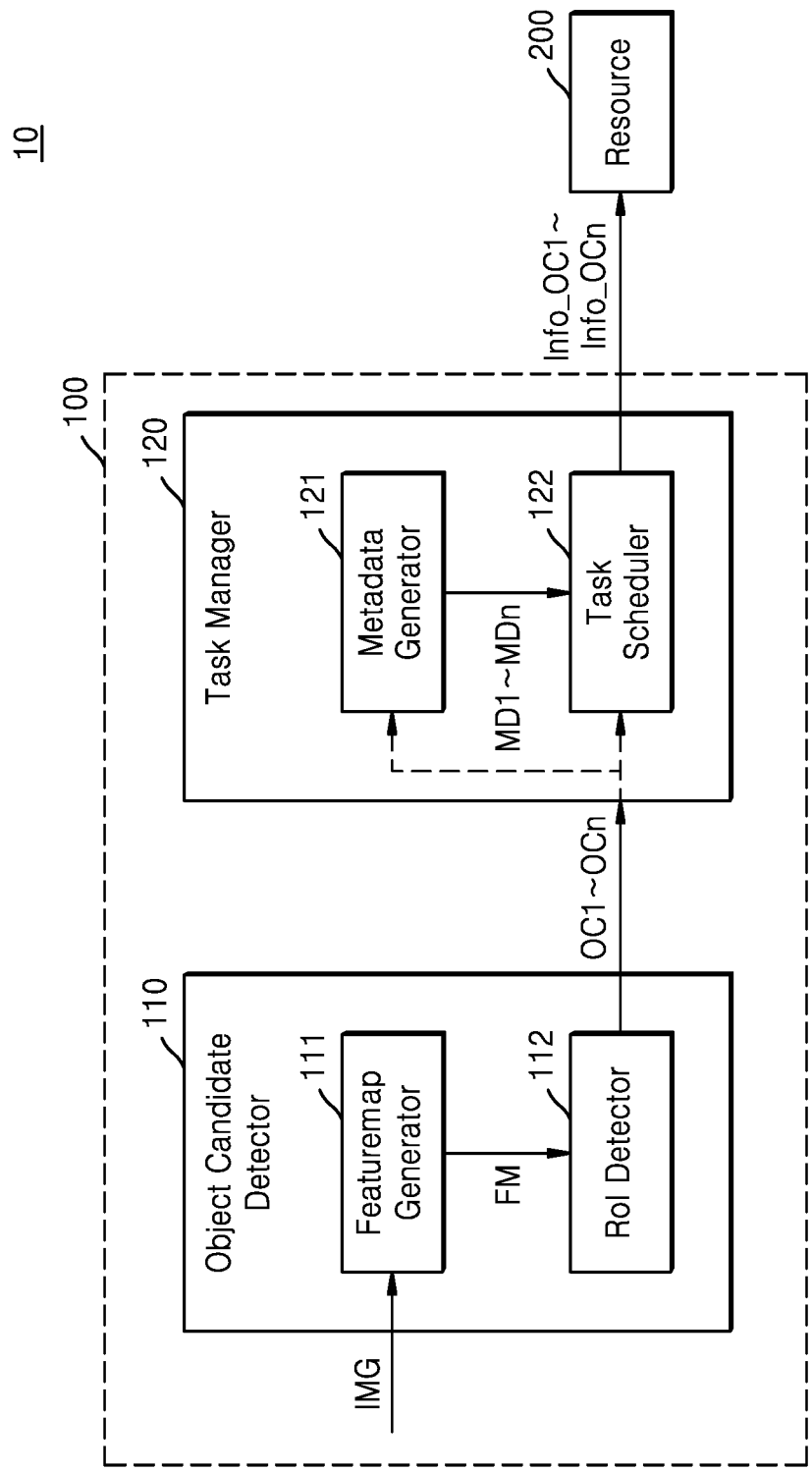
FIG. 2 is a detailed block diagram of a neural network system according to an example embodiment.

FIG. 2 is a detailed block diagram of a neural network system according to an example embodiment. More specifically, FIG. 2 shows in detail the neural network system 10 of FIG. 1.

Referring to FIG. 2, the neural network system 10 may include a model processor 100 and a resource 200, the object candidate detector 110 may include a featuremap generator 111 and an RoI detector 112, and the task manager 120 may include a metadata generator 121 and a task scheduler 122.

The featuremap generator 111 may generate a featuremap by using the image IMG received from outside. In an example embodiment, the featuremap generator 111 may generate a featuremap (FM) indicating features of the image IMG by performing a convolution computation using the image IMG received from outside. The disclosure is not limited thereto, and the featuremap generator 111 may generate the featuremap FM based on a separate computation. The featuremap generator 111 may provide the generated featuremap FM to the RoI detector 112.

The RoI detector 112 may detect an RoI (e.g., an object candidate) that is a region where a probability of an object of interest existing in the region is high, by analyzing the featuremap FM received from the featuremap generator 111. In an example embodiment, the RoI detector 112 may detect a plurality of RoIs (e.g., a plurality of object candidates OC1 through OCn) by using an RPN model. The disclosure is not limited thereto, and the RoI detector 112 may detect the plurality of RoIs by using a separate model. The RoI detector 112 may provide the detected plurality of object candidates OC1 through OCn to the task manager 120. According to an example embodiment, the RoI detector 112 may provide the input image IMG together with the plurality of object candidates OC1 through OCn to the task manager 120.

The task manager 120 may receive the plurality of object candidates OC1 through OCn from the object candidate detector 110, generate metadata MD1 through MDn of the plurality of object candidates OC1 through OCn based on the input image IMG, and set a data processing order for the plurality of object candidates OC1 through OCn based on the generated metadata MD1 through MDn.

More specifically, the metadata generator 121 may receive the plurality of object candidates OC1 through OCn from the object candidate detector 110 and generate the metadata MD1 through MDn corresponding to the plurality of object candidates OC1 through OCn by using the image IMG and the received plurality of object candidates OC1 through OCn. The metadata may include information about a size, a position in the image IMG, a top left coordinate, a bottom right coordinate, a distance from a preset coordinate or a preset region, a depth, etc., of each of the plurality of object candidates. The disclosure is not limited thereto, and a type of the metadata may include additional information as well as the above-described information. The metadata generator 121 may provide the generated metadata MD1 through MDn to the task scheduler 122.

The task scheduler 122 may receive the metadata MD1 through MDn of the plurality of object candidates OC1 through OCn from the metadata generator 121, and set a data processing order for the plurality of object candidates based on the metadata MD1 through MDn. In an example embodiment, the task scheduler 122 may calculate a score indicating an importance of the plurality of object candidates according to one or more criteria by using the metadata MD1 through MDn, and set the data processing order for the plurality of object candidates OC1 through OCn by using the calculated score.

The task manager 120 may provide information Info_OC1 through Info_OCn related to data processing of the plurality of object candidates OC1 through OCn according to the set data processing order. In an example embodiment, the information Info_OC1 through Info_OCn related to data processing of the plurality of object candidates OC1 through OCn may include the plurality of object candidates OC1 through OCn and the metadata MD1 through MDn. That is, the task scheduler 122 may provide RoIs detected by the RoI detector 112 and the metadata thereof to the resource 200.

The resource 200 may perform object recognition with respect to the plurality of object candidates OC1 through OCn in an order in which the information Info_OC1~Info_OCn related to data processing of the plurality of object candidates OC1 through OCn are received, and execute a task corresponding to an object recognition result. The task corresponding to the object recognition result may include one or more tasks, and may be set variously according to a type or use, a user, a designer, or setting of a manufacturer of a device including the neural network system 10. For example, when the neural network system 10 is included in an autonomous driving vehicle and a recognized object is an 'automobile', the resource 200 may perform, as a task corresponding to the recognized 'automobile', an operation of calculating a distance between the recognized 'automobile' and the autonomous driving vehicle and an operation of generating a control command for controlling a speed of the autonomous driving vehicle based on the calculated distance.

Figure 3:
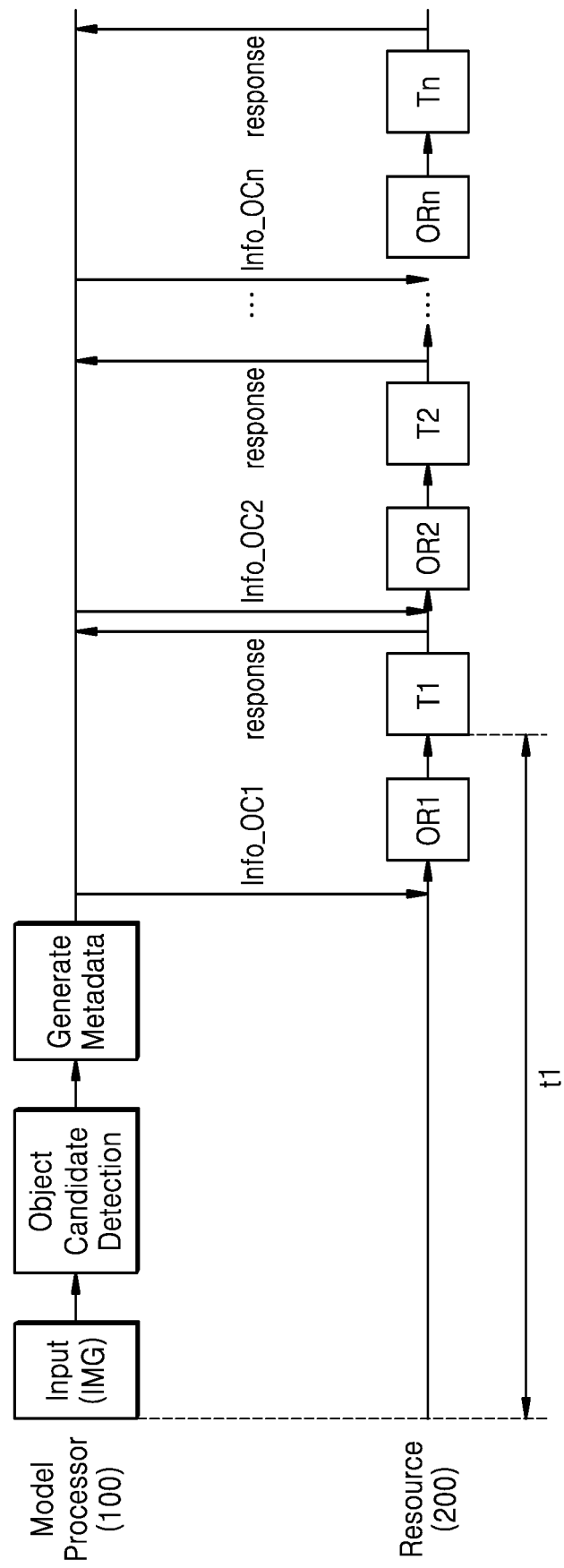
FIG. 3 is a conceptual diagram illustrating an object recognition method according to an example embodiment.

FIG. 3 is a conceptual diagram illustrating an object recognition method according to an example embodiment. More specifically, FIG. 3 is a conceptual diagram illustrating an object recognition method of a neural network system, according to an example embodiment.

Referring to FIGS. 1 through 3, the model processor 100 of a neural network system 10 according to an example embodiment may detect a plurality of object candidates by analyzing the input image IMG. A method of detecting an object candidate may be the same as the method described above with reference to FIGS. 1 and 2, and thus will not be repeatedly described. The model processor 100 may generate metadata of the detected plurality of object candidates and set a data processing order for object candidates based on the generated metadata.

The model processor 100 may sequentially provide the information Info_OC1 through Info_OCn related to data processing of the plurality of object candidates OC1 through OCn to the resource 200 according to the set data processing order. For example, referring to FIG. 3, the model processor 100 may provide the information Info_OC1 related to data processing of the first object candidate having a preceding order among the plurality of object candidates OC1 through OCn of the image IMG to the resource 200. When the task manager 120 receives a response indicating completion of execution of a task for the first object candidate from the resource 200, the task manager 120 may provide the information Info_OC2 related to data processing of the second object candidate OC2 of a next order to the resource 200.

The resource 200 may receive the information Info_OC1 through Info_OCn related to data processing of the plurality of object candidates OC1 through OCn from the model processor 100, and perform data processing for the plurality of object candidates OC1 through OCn according to an order in which the information Info_OC1 through Info_OCn related to data processing of the plurality of object candidates OC1 through OCn are received. For example, referring to FIG. 3, when the resource 200 may receive the information Info_OC1 for the first object candidate, the resource 200 may perform first object recognition OR1 for the first object candidate OC1 and execute a first task T1 corresponding to a result of the first object recognition OR1. When the resource 200 may receive the information Info_OC2 for the second object candidate, the resource 200 may perform second object recognition OR2 for the second object candidate OC2 and execute a second task T2 corresponding to a result of the second object recognition OR2. As such, the resource 200 may equally perform object recognition OR3 . . . ORn for the other object candidates OC3 . . . OCn and then perform tasks T3 . . . Tn corresponding to respective object recognition results.

The model processor 100 of a neural network system according to the related art may detect the plurality of object candidates OC1 through OCn by analyzing the input image IMG and provide the information related to data processing of the plurality of object candidates OC1 through OCn to the resource 200. The resource 200 may perform object recognition with respect to the plurality of object candidates OC1 through OCn based on the information related to data processing of the plurality of object candidates OC1 through OCn, received from the model processor 100, and execute tasks corresponding to object recognition results. For example, referring to FIG. 3, the resource 200 may perform tasks T1 through Tn corresponding to object recognition results only after the resource 200 performs object recognition OR1 through ORn for the plurality of object candidates OC1 through OCn.

That is, the neural network system according to the related art may perform object recognition in a unit of a frame. Thus, a time required until the neural network system starts a task corresponding to an object recognition result may increase in proportional to the number of objects (or object candidates) included in the image IMG.

Recently, techniques using object recognition in an image increase, and not only the number of images for which object recognition is to be performed, but also the type and number of objects of interest to be recognized in the image increase. Thus, when the neural network system according to the related art is used, time at which the task corresponding to the object recognition result starts may be delayed due to an increase in the time required for performing object recognition for the image, and for example, a bottleneck phenomenon may be caused by performing object recognition in a longer time. In particular, in a technique that requires precise control using object recognition such as in autonomous driving that controls a vehicle based on a result of recognizing objects near the autonomous vehicle driving, the aforementioned problem is a serious limitation.

The neural network system 10 according to an example embodiment may perform object recognition in a unit of an object. Thus, a time (e.g., t1 in FIG. 3) required until the neural network system 10 starts a task corresponding to an object recognition result may not include a time required for performing object recognition OR2 through ORn with respect to the other object candidates. Thus, the time t1 required until start of the task corresponding to the object recognition result may be less than the time required in the neural network system according to the related art.

Thus, when the neural network system according to an example embodiment is used, the bottleneck phenomenon caused by frame-based object recognition may be prevented, the time at which the task corresponding to an object recognition result starts may be advanced, and data processing for an object candidate having a high importance may be preferentially performed. Hence, the neural network system according to an example embodiment may perform fine-grained control based on object recognition.

Figure 4:
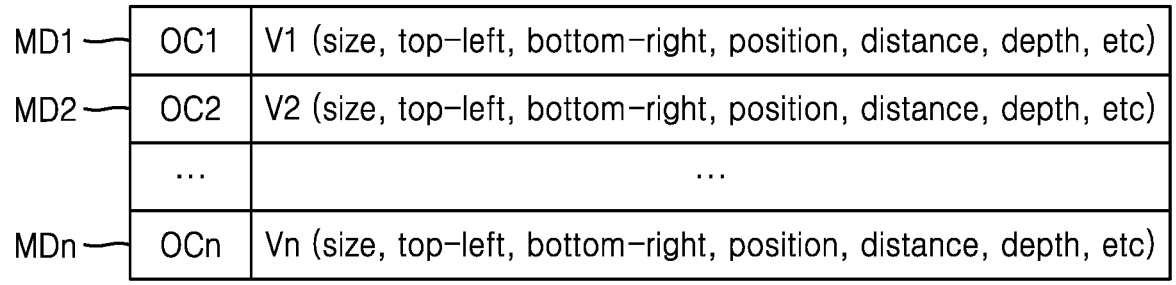
FIG. 4 illustrates metadata of an object candidate according to an example embodiment.

FIG. 4 illustrates metadata of an object candidate according to an example embodiment. More specifically, FIG. 4 illustrates metadata of an object candidate generated by the task manager 120 of FIG. 2.

Referring to FIGS. 2 and 4, the task manager 120 may receive the plurality of object candidates OC1 through OCn from the object candidate detector (110 of FIG. 2) and generate a metadata table MT regarding the plurality of object candidates OC1 through OCn. The metadata table MT may include the metadata MD1 through MDn of the plurality of object candidates OC1 through OCn. The metadata MD1 through MDn may include various information expressed in the form of names (or numbers, indices, identifiers, etc.) and vectors of the plurality of object candidates OC1 through OCn. For example, the metadata MD1 through MDn may include information about a size, a position in the image IMG, a top left coordinate, a bottom right coordinate, a distance from a preset coordinate or a preset region, a depth, etc., of each of the plurality of object candidates OC1 through OCn. The disclosure is not limited thereto, and a type of the metadata may include additional information as well as the above-described information. For example, although not shown in FIG. 4, the metadata MD1 through MDn may further include metadata of an object corresponding to an object candidate of an image of a current frame among objects recognized in an image of a previous frame.

The task manager 120 may generate the metadata table MT and store the generated metadata table MT in a memory (not shown) region included in the model processor 100 or in an external memory (not shown) region accessible by the task manager 120.

Hereinbelow, with reference to FIGS. 5 through 7, a method of setting a data processing order for a plurality of object candidates using the metadata table MT generated by the model processor 100 will be described.

Figure 5:
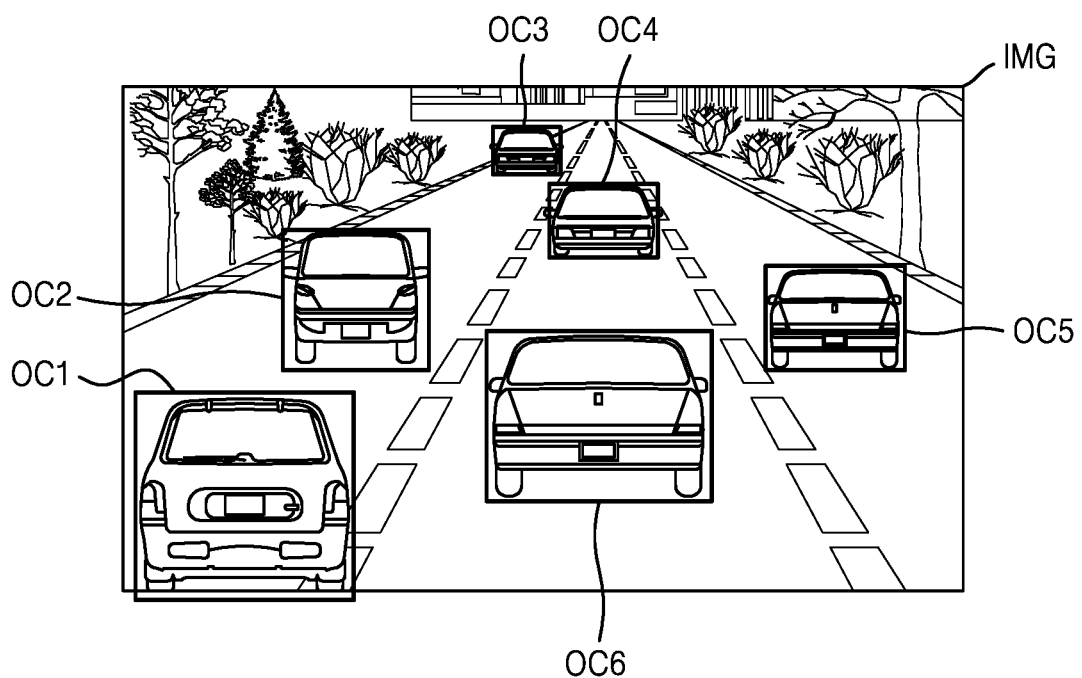
FIG. 5 illustrates a plurality of object candidates included in an image, according to an example embodiment.

FIG. 5 illustrates a plurality of object candidates included in an image, according to an example embodiment. Referring to FIG. 5, the image IMG shows a foreground of an autonomous driving vehicle, captured using a camera attached to the autonomous driving vehicle.

Referring to FIGS. 1, 2, and 5, the object candidate detector 110 may receive the image IMG, analyze the received image IMG, and detect a plurality of object candidates included in the image IMG. For example, referring to FIG. 5, the object candidate detector 110 may detect six object candidates OC1 through OC6 included in the image IMG by using a neural network model such as an RPN, etc. The object candidate detector 110 may provide the detected object candidates OC1 through OC6 to the task manager 120.

Figure 6:
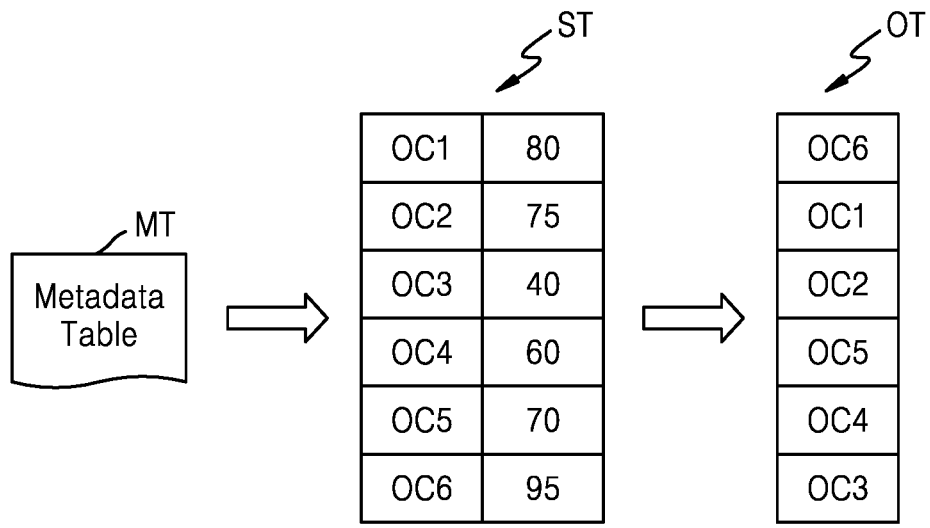
FIG. 6 is a conceptual diagram illustrating a method for generating an order table, according to an example embodiment.

FIG. 6 is a conceptual diagram illustrating a method for generating an order table, according to an example embodiment. Referring to FIGS. 1, 2, 4 through 6, the metadata generator 121 of the task manager 120 may receive a plurality of object candidates from the object candidate detector 110 and generate the metadata table MT for the received plurality of object candidates. The metadata generator 121 may provide the generated metadata table MT to the task scheduler 122.

The task scheduler 122 according to the disclosure may generate a score table ST of the plurality of object candidates by using the metadata table MT. The score table ST may include a name (or a number, an index, an identifier, etc.) of each of the plurality of object candidates and a score indicating an importance of each of the plurality of object candidates according to one or more criteria. The one or more criteria may be preset according to an application and a purpose of using a neural network system according to an example embodiment. In an example embodiment, the task scheduler 122 may calculate scores of the plurality of object candidates by inputting information of the metadata to a function implemented using multiple inputs and multiple weights. For example, the preset criteria may be a distance and a size of an object candidate, and the task scheduler 122 may calculate a score of each of the plurality of object candidates by using the following function:

$$Score = k1 \times 1/|distance| + k2 \times size$$

(k1 indicates a weight for a reciprocal of a distance and k2 indicates a weight for a size).

A function of calculating a score by using metadata is not limited to the above-described example, and may be implemented in various forms. For example, referring to FIG. 5, an object candidate having the highest score may be the object candidate OC6 that is located closest to a preset coordinate (e.g., a coordinate corresponding to an autonomous driving vehicle) and has a large size. An object candidate having the lowest score may be the object candidate OC3 that is located farthest from the preset coordinate and has a small size.

The task scheduler 122 according to the disclosure may generate an order table OT by using the generated score table ST. In an example embodiment, the task scheduler 122 may generate the order table OT indicating a data processing order for the plurality of object candidates by arranging scores of the plurality of object candidates included in the score table ST in a descending order. For example, referring to FIG. 6, the task scheduler 122 may generate the order table OT indicating an order from the object candidate OC6 having the highest score to the object candidate OC3 having the lowest score by using the score table ST.

The task scheduler 122 may sequentially provide information about the plurality of object candidates to the resource 200 by using the generated order table OT. For example, referring to FIG. 6, the task scheduler 122 may identify the object candidate OC6 of the first order by using the order table OT and provide information about the identified object candidate OC6 to the resource 200. The task scheduler 122 may identify the object candidate OC1 of the next order by using the order table OT and provide information about the identified object candidate OC1 to the resource 200. The task scheduler 122 may repeat the foregoing operation with respect to the other object candidates in the order table OT.

According to an example embodiment of the disclosure, the task scheduler 122 may provide the order table OT together with the information about the plurality of object candidates to the resource 200. The resource 200 may perform object recognition with respect to an object candidate of the first order by using the received order table OT, and execute a task corresponding to an object recognition result. The resource 200 may perform object recognition with respect to an object candidate of the next order and execute a task corresponding to an object recognition result.

For example, referring to FIG. 6, the resource 200 may perform object recognition with respect to the object candidate OC6 of the first order by using the order table OT and execute a task corresponding to an object recognition result. The resource 200 may perform object recognition with respect to the object candidate OC1 of the next order by using the order table OT and execute a task corresponding to an object recognition result. The task scheduler 122 may repeat the foregoing operation for the other object candidates in the order table OT.

In illustration of FIG. 6 and description with reference to FIG. 6, it is illustrated that the task scheduler 122 generates the order table OT, the task scheduler 122 may be implemented to generate a linked list indicating a data processing order of the plurality of object candidates, a search tree, or a first in first out (FIFO).

Figure 7:
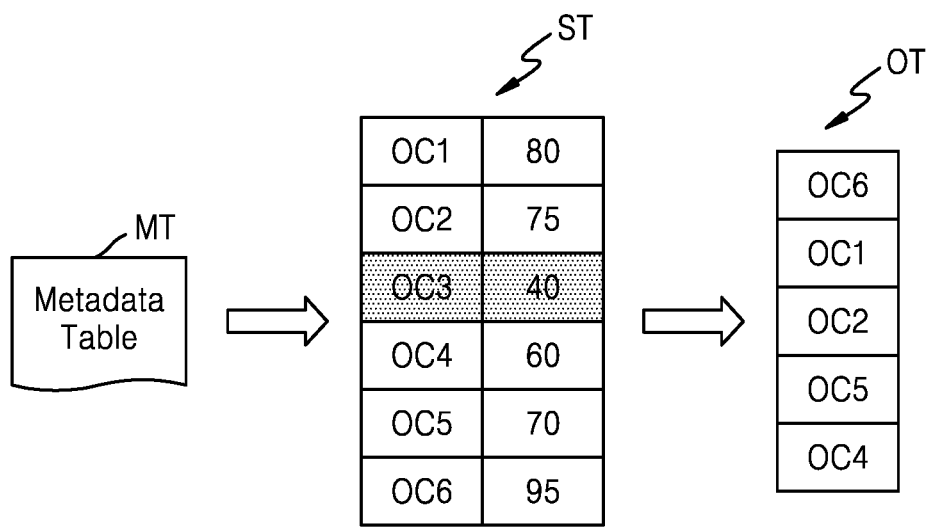
FIG. 7 is a conceptual diagram illustrating a method for generating an order table, according to an example embodiment.

FIG. 7 is a conceptual diagram illustrating a method for generating an order table, according to an example embodiment. More specifically, FIG. 7 is a conceptual diagram illustrating an example of a modified embodiment of FIG. 6.

FIGS. 1, 2, and 4 through 7, when the task scheduler 122 generates the order table OT by using the score table ST, the task scheduler 122 may set an order with respect to object candidates excluding an object candidate having a score less than a first threshold value. The first threshold value may refer to a minimum value of a score based on which object recognition is to be performed.

For example, the first threshold value may be 50 in an example embodiment of FIG. 7. The task scheduler 122 may identify the object candidate OC3 having a score less than the first threshold value of 50 in the score table ST, and arrange scores of the other object candidates OC1, OC2, and OC4 through OC6 except for the identified object candidate OC3 in a descending order, thereby generating the order table OT. The task scheduler 122 may provide information about the plurality of object candidates to the resource 200 by using the generated order table OT.

The neural network system according to an example embodiment may reduce the amount of computation and the speed of computation by performing object recognition with respect to object candidates except for an object candidate which does not require object recognition based on a lower score of the object candidate.

Figure 8:
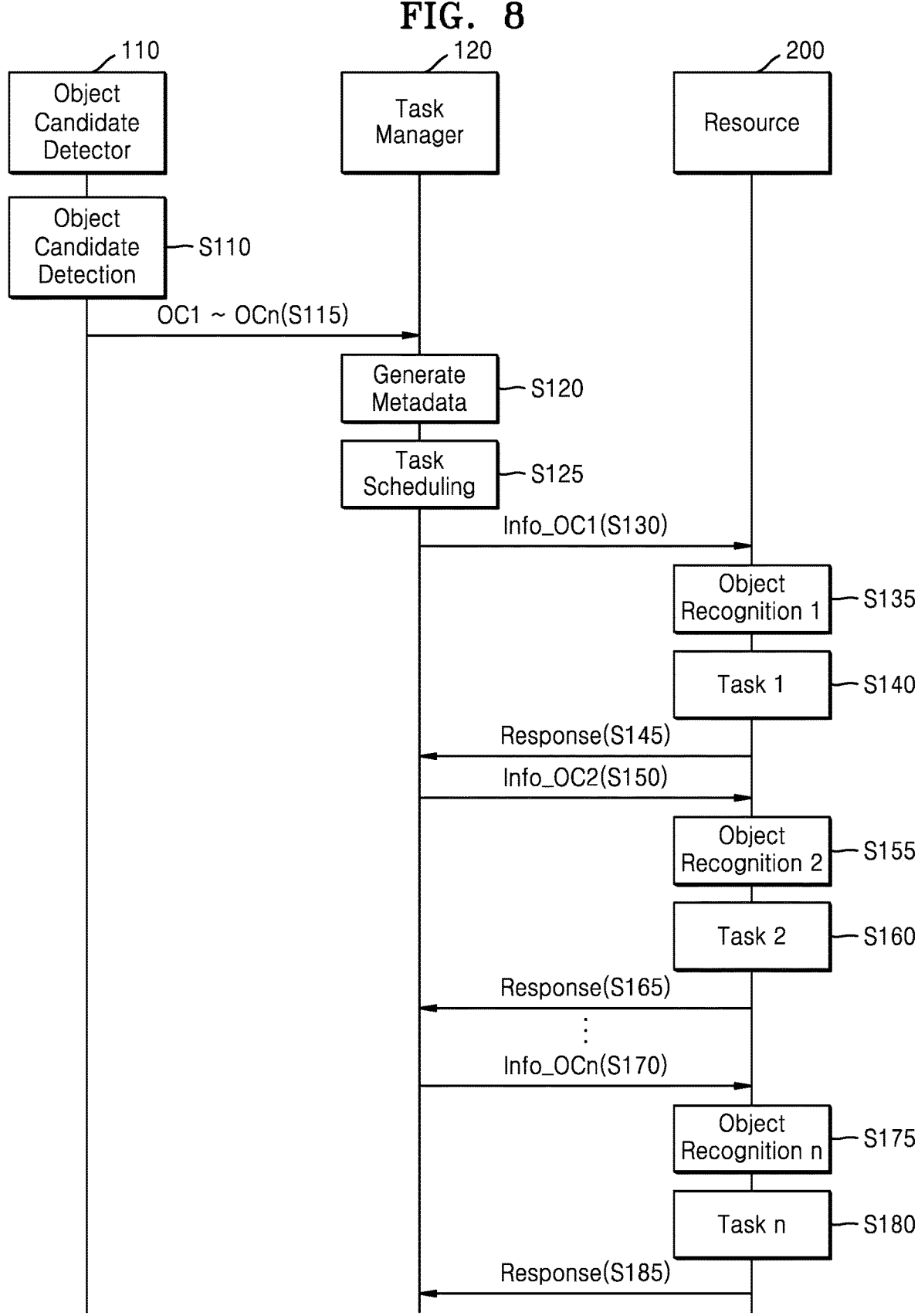
FIG. 8 is a flowchart illustrating an example of operations of a model processor and resources, according to an example embodiment.

FIG. 8 is a flowchart illustrating an example of operations of a model processor and a resource, according to an example embodiment. More specifically, a flowchart illustrating an example of operations of the model processor 100 and the resource of FIG. 1 or 2 is shown.

Referring to FIG. 8, the object candidate detector 110 may detect the plurality of object candidates OC1 through OCn by analyzing the input image, in operation S110. The object candidate detector 110 may provide the detected plurality of object candidates OC1 through OCn to the task manager 120, in operation S115. According to an example embodiment, the object candidate detector 110 may provide the input image, together with the plurality of object candidates OC1 through OCn, to the task manager 120.

The task manager 120 may generate metadata of the received plurality of object candidates OC1 through OCn. The task manager 120 may set a data processing order for the plurality of object candidates OC1 through OCn by using the generated metadata, in operation S125. In an example embodiment, the task manager 120 may calculate scores respectively indicating importances of the plurality of object candidates OC1 through OCn by using the metadata and generate the order table OT by using the calculated score, as described with reference to FIG. 6.

In an example embodiment, the task manager 120 may generate the order table OT by using object candidates other than an object candidate having a score less than a first threshold value among the calculated scores, as described with reference to FIG. 7. The task manager 120 may provide information Info_OC1 related to data processing of the first object candidate to the resource 200, according to the set data processing order. In an example embodiment, the task manager 120 may identify the set data processing order in the generated order table OT, and provide the information Info_OC1 related to data processing of the first object candidate to the resource 200, according to the set data processing order. According to an example embodiment, the task manager 120 may provide the input image, together with the information Info_OC1 related to data processing of the first object candidate, to the resource 200.

The resource 200 may perform first object recognition by using the received information Info_OC1 related to data processing of the first object candidate, in operation S135. The resource 200 may execute a first task corresponding to first object recognition, in operation S140. The resource 200 may transmit a response indicating completion of the first task to the task manager 120, in operation S145.

When the task manager 120 receives the response from the resource 200, the task manager 120 may identify a second object candidate corresponding to a next order of the first object candidate according to the set data processing order, and provide the information Info_OC2 related to data processing of the second object candidate to the resource 200, in operation S150.

The resource 200 may perform second object recognition by using the received information Info_OC2 related to data processing of the second object candidate, in operation S155. The resource 200 may execute a second task corresponding to second object recognition, in operation S160. The resource 200 may transmit a response indicating completion of the second task to the task manager 120, in operation S165.

The task manager 120 and the resource 200 may repeatedly perform, with respect to object candidates included in the order table OT, an operation of providing information related to data processing of an object candidate, an operation of performing object recognition, an operation of performing a task corresponding to an object recognition result, and an operation of transmitting a response indicating task completion, in operations S170 through S185.

Figure 9:
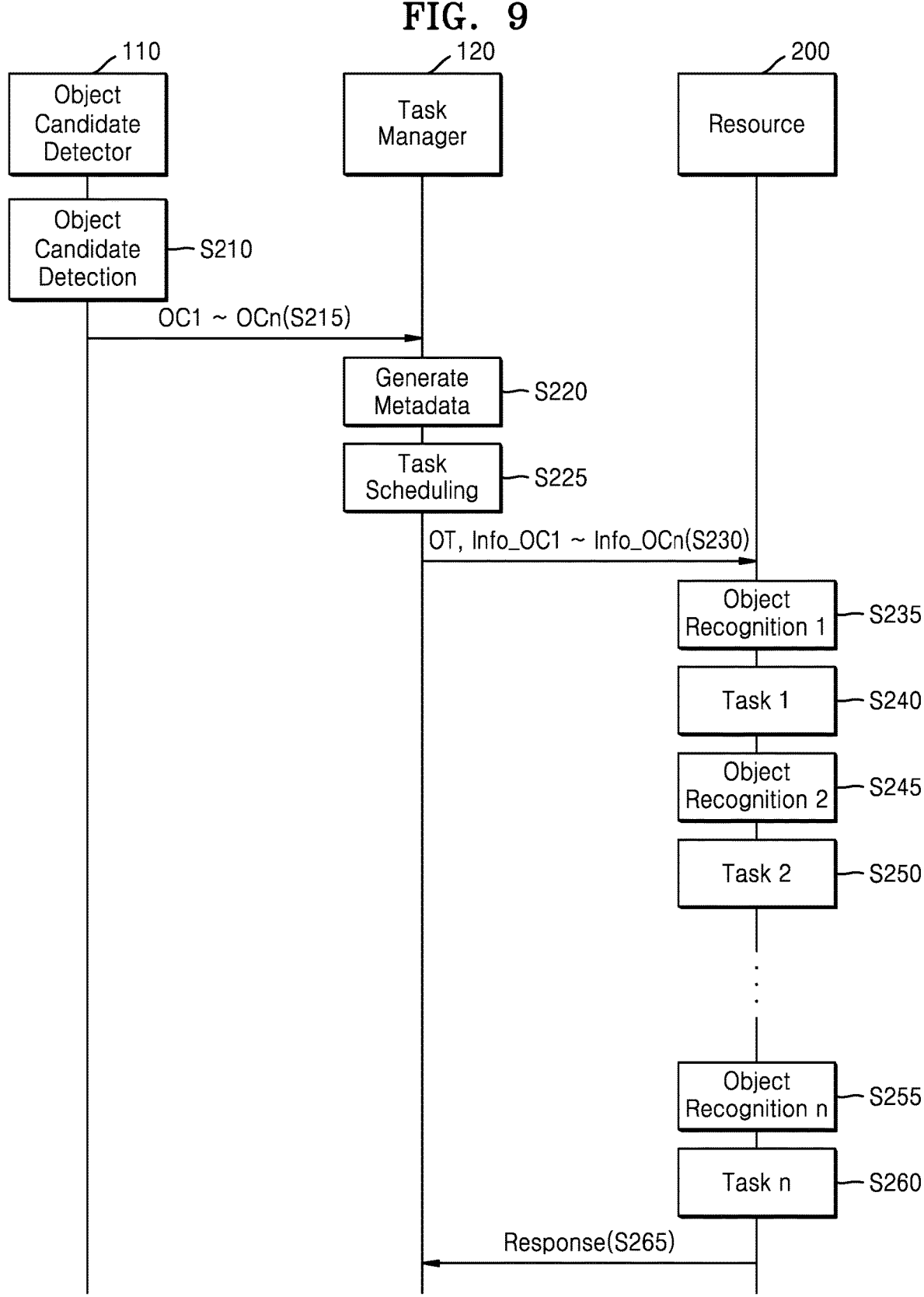
FIG. 9 illustrates an example of operations of a model processor and resources, according to an example embodiment.

FIG. 9 illustrates an example of operations of a model processor and a resource, according to an example embodiment. More specifically, FIG. 9 illustrates an example of a modified embodiment of FIG. 8. Operations S210 and S220 of FIG. 9 may be substantially the same as operations S110 and S120 of FIG. 8, and thus will not be described repeatedly.

The task manager 120 may generate the order table OT indicating a data processing order for the plurality of object candidates OC1 through OCn by using the generated metadata, in operation S225. In an example embodiment, the task manager 120 may calculate scores respectively indicating importances of the plurality of object candidates OC1 through OCn by using the metadata and generate the order table OT by using the calculated score, as described with reference to FIG. 6. In an example embodiment, the task manager 120 may generate the order table OT by using object candidates other than an object candidate having a score less than a first threshold value among the calculated scores, as described with reference to FIG. 7. The task manager 120 may provide the generated order table OT and the information Info_OC1 through Info_OCn related to data processing of the plurality of object candidates OC1 through OCn to the resource 200, in operation S230.

The resource 200 may identify an order by using the received order table OT, perform object recognition for each object candidate according to the identified order, and execute a task corresponding to an object recognition result. That is, the resource 200 may perform object recognition with respect to the first object candidate of the first order in operation S235 and execute a task corresponding to an object recognition result for the first object candidate in operation S240. The resource 200 may perform object recognition with respect to the second object candidate having the next order in operation S245, and execute a task corresponding to an object recognition result for the second object candidate in operation S250. The resource 200 may repeatedly perform the foregoing operation of performing object recognition and the operation of executing the task corresponding to the object recognition result with respect to object candidates included in the order table OT, in operations S255 and S260. The resource 200 may transmit a response indicating completion of tasks corresponding to the plurality of object candidates OC1 through OCn to the task manager 120, in operation S265.

While it is described with reference to FIG. 9 that the task manager 120 transmits, for one object candidate, information related to data processing of the one object candidate to the resource 200. However, the disclosure is not limited thereto, and the task manager 120 may transmit the information related to data processing of a preset number of object candidates (e.g., two or more object candidates) to the resource 200 which may then perform object recognition operations with respect to the present number of object candidates by using the received information related to data processing of the preset number of object candidates and execute the tasks corresponding to the object recognition results.

Figure 10:
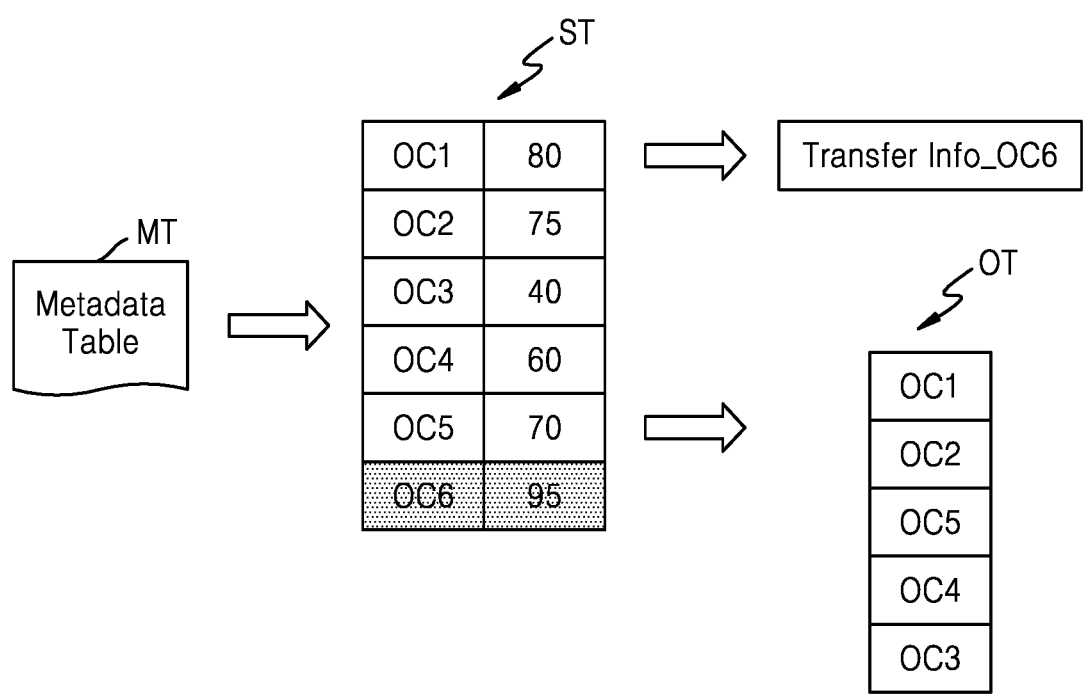
FIG. 10 is a conceptual diagram illustrating a method for generating an order table, according to an example embodiment.

FIG. 10 is a conceptual diagram illustrating a method for generating an order table, according to an example embodiment. More specifically, FIG. 10 is a conceptual diagram illustrating an example of a modified embodiment of FIG. 6.

Referring to FIG. 10, the task scheduler 122 according to the disclosure may generate the score table ST of the plurality of object candidates by using the metadata table MT, and identify an object candidate having a score exceeding a second threshold value by using the score table ST. The second threshold value may be based on a score indicating a high need to perform object recognition. The object candidate having the score exceeding the second threshold value may be highly likely to correspond to an object of interest, and may be an important criterion for controlling a device to which the neural network system is applied.

When the task scheduler 122 identifies that the object candidate having the score exceeding the second threshold value does not exist, the task scheduler 122 may arrange the scores in the descending order as described with reference to FIG. 6, thus generating the order table OT.

On the other hand, when the task scheduler 122 identifies that the object candidate having the score exceeding the second threshold value exists, the task scheduler 122 may immediately provide information related to data processing of the identified object candidate to the resource 200. The resource 200 may perform object recognition with respect to the identified object candidate and execute a task corresponding to an object recognition result, by using the received information related to data processing of the object candidate.

For example, the second threshold value may be 90 in an example embodiment of FIG. 10. The task scheduler 122 may identify the object candidate OC6 having the score exceeding a second threshold value of 90 in the score table ST, and immediately provide the information Info OC6 related to data processing of the identified object candidate OC6 to the resource 200. The resource 200 may perform object recognition with respect to the object candidate OC6 by using the received information Info OC6 and execute a task corresponding to an object recognition result.

The task scheduler 122 may generate the order table OT by using scores for the other object candidates, after providing information about the object candidate having the score exceeding the second threshold value to the resource 200. For example, referring to FIG. 10, the task scheduler 122 may generate the order table OT by using scores for the other object candidates OC1 through OC5.

The task manager 120 may sequentially provide the information Info_OC1 through Info OC5 related to data processing of the plurality of object candidates OC1 through OC5 to the resource 200, by using the generated order table OT. The resource 200 may perform object recognition with respect to the other object candidates OC1 through OC5 and execute a task corresponding to an object recognition result, according to an order in which the information Info_OC1 through Info OC5 are received.

According to a modifiable example embodiment of the disclosure, the task scheduler 122 may provide the order table OT together with the information Info_OC1 through Info OC5 related to data processing of the other object candidates OC1 through OC5 to the resource 200. The resource 200 may perform object recognition with respect to the other object candidates OC1 through OC5 and execute a task corresponding to an object recognition result, by using the received order table OT.

When the neural network system according to an example embodiment identifies the object candidate determined as having a high need to perform object recognition, object recognition may be immediately performed with respect to the identified object candidate and a task corresponding to an object recognition result may be executed. Accordingly, the neural network system according to the disclosure may perform fine-grained control for a device to which the neural network system is applied.

Figure 11:
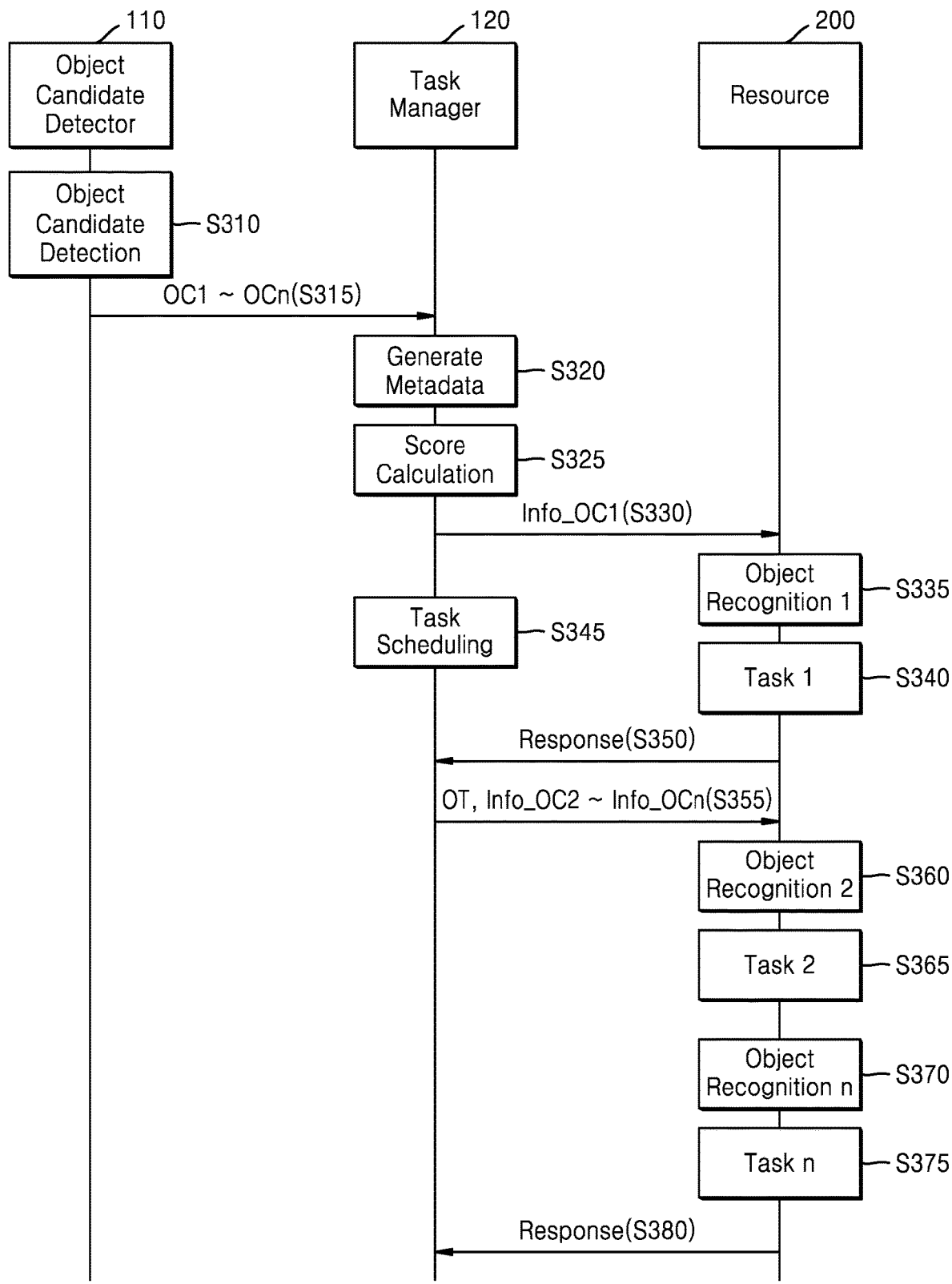
FIG. 11 is a flowchart illustrating an example of operations of a model processor and resources, according to an example embodiment.

FIG. 11 is a flowchart illustrating an example of operations of a model processor and a resource, according to an example embodiment. More specifically, FIG. 11 illustrates an example of a modified embodiment of FIG. 8. Operations S310 and 5320 of FIG. 11 may be substantially the same as operations S110 and S120 of FIG. 8, and thus will not be described repeatedly.

The task manager 120 may calculate scores indicating an importance of each of the plurality of object candidates OC1 through OCn by using metadata, in operation S325. The task manager 120 may identify an object candidate having the score exceeding the second threshold value among the calculated scores, as described with reference to FIG. 10. When the first object candidate having the score exceeding the second threshold value is identified, the information Info_OC1 related to data processing of the first object candidate may be provided to the resource 200, in operation S330.

The resource 200 may perform first object recognition with respect to the first object candidate by using the received information Info_OC1 related to data processing of the first object candidate, in operation S335. The resource 200 may execute a first task corresponding to first object recognition, in operation S340. The resource 200 may transmit a response indicating completion of the first task to the task manager 120, in operation S350.

After the task manager 120 provides the information Info_OC1 related to data processing of the first object candidate to the resource 200 in operation S330, the task manager 120 may set a data processing order for object candidates OC2 through OCn, other than the first object candidate, by using scores of the other object candidates, in operation S345. When the task manager 120 receives a response from the resource 200 in operation S350, the task manager 120 may provide the generated order table OT and the information Info_OC2 through Info_OCn related to data processing of the other object candidates to the resource 200, in operation S355.

The resource 200 may identify an order of each of the other object candidates OC2 through OCn by using the received order table OT, perform object recognition for each object candidate according to the identified order, and execute a task corresponding to an object recognition result, in operations S360, S365, S370, and S375. The resource 200 may transmit a response indicating completion of the tasks to the task manager 120, in operation S380.

In a modifiable example embodiment, the task manager 120 may sequentially provide the information Info_OC2 through Info_OCn related to data processing of the other object candidates OC2 through OCn to the resource 200 according to the set data processing order. The resource 200 may perform object recognition in an order in which the information Info_OC2~Info_OCn related to data processing of the other object candidates OC2 through OCn are received, and execute a task corresponding to an object recognition result.

Figure 12:
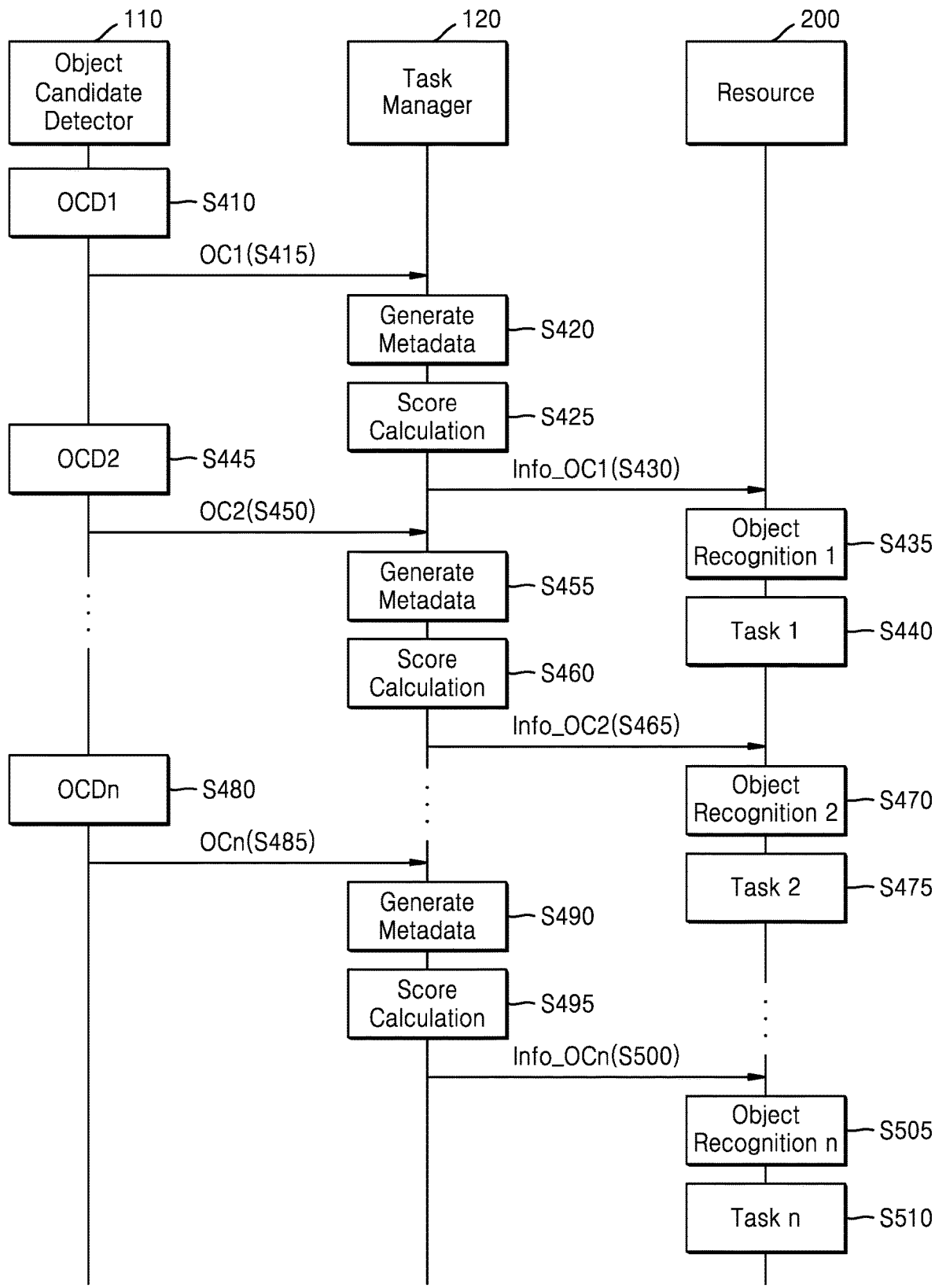
FIG. 12 illustrates an example of operations of a model processor and resources, according to an example embodiment.

FIG. 12 illustrates an example of operations of a model processor and a resource, according to an example embodiment. More specifically, FIG. 12 illustrates an example of a modified embodiment of FIG. 8.

The object candidate detector 110 may detect object candidates by analyzing the input image. The object candidate detector 110 according to an example embodiment may be implemented to transmit an object candidate to the task manager 120 at every detection of each object candidate, by analyzing the input image. Detailed operations thereof will be described below.

Referring to FIG. 12, the object candidate detector 110 may detect the first object candidate OC1 by analyzing the input image, in operation S410. The object candidate detector 110 may transmit the detected object candidate OC1 to the task manager 120, in operation S415.

The task manager 120 may generate metadata of the received first object candidate OC1 in operation S420. The task manager 120 may calculate a score indicating an importance of the first object candidate OC1, based on the generated metadata, in operation S425. The task manager 120 may determine whether the calculated score exceeds the first threshold value. The first threshold value may refer to a minimum value of a score indicating a degree of a need to perform object recognition. When the score of the first object candidate OC1 exceeds the first threshold value, the task manager 120 may transmit the information Info_OC1 related to data processing of the first object candidate OC1 to the resource 200, in operation S430.

The resource 200 may perform first object recognition based on the received information related to data processing of the first object candidate OC1, in operation S435. The resource 200 may execute a first task corresponding to a result of the first object recognition, in operation S440.

The object candidate detector 110 may transmit the first object candidate OC1 to the task manager 120 and continuously analyze the image, thus detecting the second object candidate OC2 that is a next object candidate, in operation S445. The object candidate detector 110 may transmit the detected object candidate OC2 to the task manager 120, in operation S450.

The task manager 120 may generate metadata of the received second object candidate OC2 in operation S455. The task manager 120 may calculate a score indicating an importance of the second object candidate OC2, based on the generated metadata, in operation S460. The task manager 120 may determine whether the calculated score exceeds the first threshold value. When the score of the second object candidate OC2 exceeds the first threshold value, the task manager 120 may transmit the information Info_OC2 related to data processing of the second object candidate OC2 to the resource 200, in operation S465.

The resource 200 may perform second object recognition based on the received information related to data processing of the second object candidate OC2, in operation S470. The resource 200 may execute a second task corresponding to a result of the second object recognition, in operation S475.

The object candidate detector 110, the task manager 120, and the resource 200 may repeatedly perform the above-described operations for the other object candidates OC3 through OCn in operations S480, S485, S490, S495, S500, S505, and S510.

In the neural network system according to an example embodiment, the object candidate detector 110, the task manager 120, and the resource perform computations in parallel, thus increasing a data processing speed for the input image.

Figure 13:
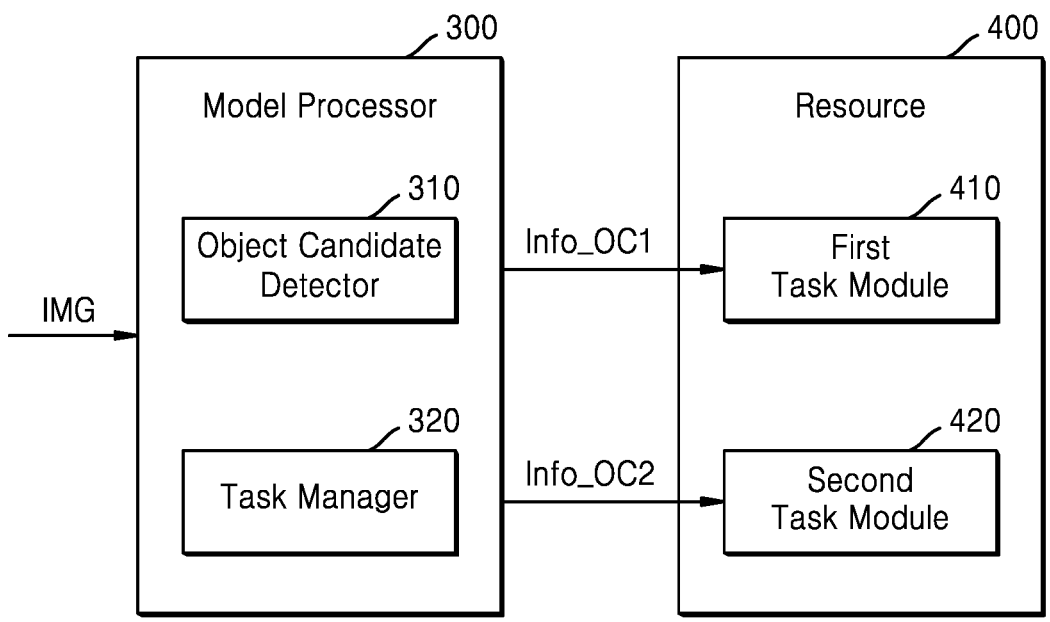
FIG. 13 is a block diagram of a neural network system according to an example embodiment.

FIG. 13 is a block diagram of a neural network system according to an example embodiment. More specifically, FIG. 13 is a block diagram showing an example of a modified embodiment of the neural network system 10 of FIG. 1.

Referring to FIG. 13, a neural network system 20 may include a model processor 300 and a resource 400, in which the model processor 300 may include an object candidate detector 310 and a task manager 320, and the resource 400 may include a first task module 410 and a second task module 420. The first task module 410 and the second task module 420 may perform object recognition and execute a task corresponding to an object recognition result. For example, each of the first task module 410 and the second task module 420 may use various types of neural network models such as a CNN like GoogLeNet, AlexNet, ResNet, a VGG network, etc., an R-CNN, a fast R-CNN, an RPN, an RNN, an S-DNN, an S-SDNN, a deconvolution network, a DBN, an RBM, a fully convolutional network, an LSTM network, a GAN, an IV3, a classification network, and so forth.

Operations of the model processor 300 of detecting a plurality of object candidates by analyzing the input image IMG, generating metadata of the plurality of object candidates, and setting a data processing order for the plurality of object candidates based on the metadata may be the same as or similar to the aforementioned embodiment and thus will not be repeatedly described.

The task manager 320 of the model processor 300 according to an example embodiment may allocate the plurality of object candidates to the first task module 410 or the second task module 420 by using the metadata.

In an example embodiment, the task manager 320 may determine an appropriate module (e.g., capable of, in processing cata, reducing the amount of computation, increasing a computational speed, or cutting down power consumption) between the first task module 410 and the second task module 420, by using metadata for data processing with respect to each of the plurality of object candidates. The task manager 320 may match each of the plurality of object candidates to the first task module 410 or the second task module 420, based on a determination result.

For example, the task manager 320 may allocate a first object candidate having a small size to the first task module 410 using an IV3 model and a second object candidate having a large size to the second task module 420 using a Resnet model. The disclosure is not limited to the foregoing example, and the task manager 320 may allocate the plurality of object candidates to the first task module 410 and the second task module 420 according to various schemes.

The model processor 300 may transmit information related to data processing of an object candidate of the plurality of object candidates to a module to which the object candidate is allocated according to a set order of the object candidate. For example, referring to FIG. 13, when the first object candidate OC1 is allocated to the first task module 410 and the second object candidate OC2 is allocated to the second task module 420, the model processor 300 may transmit the information Info_OC1 related to data processing of the first object candidate OC1 to the first task module 410 and the information Info_OC2 related to data processing of the second object candidate OC2 to the second task module 420.

Each of the first task module 410 and the second task module 420 may perform object recognition and execute a task corresponding to an object recognition result, by using the received information.

The resource 400 is illustrated and described as including the first task module 410 and the second task module 420 in FIG. 13, but the resource 400 may include three or more task modules.

As such, the neural network system according to an example embodiment may perform efficient computational processing by matching the plurality of object candidates to the plurality of task modules based on the metadata of the plurality of object candidates.

Figure 14:
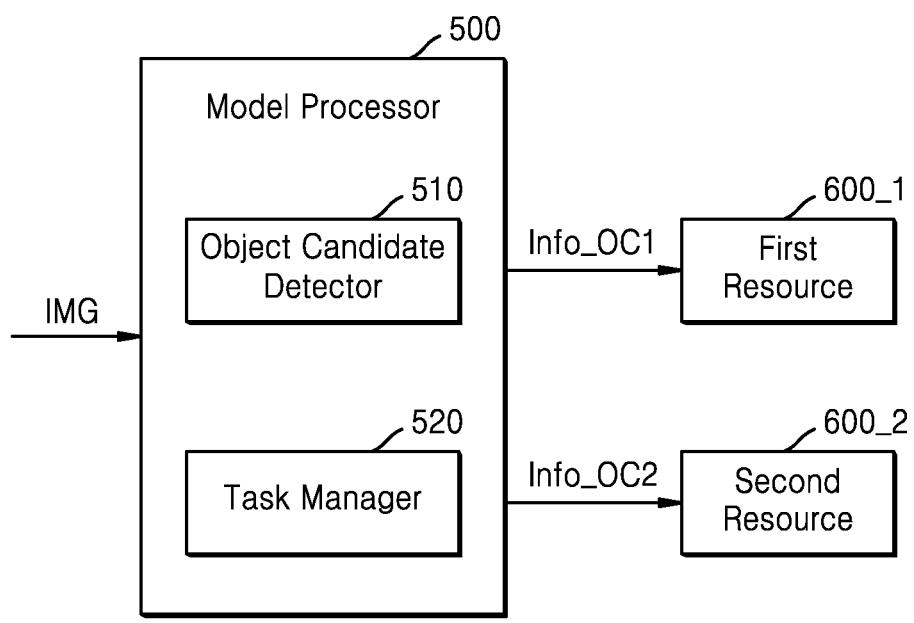
FIG. 14 is a block diagram of a neural network system according to an example embodiment.

FIG. 14 is a block diagram of a neural network system according to an example embodiment. More specifically, FIG. 14 is a block diagram showing an example of a modified embodiment of the neural network system 10 of FIG. 1.

Referring to FIG. 14, a neural network system 30 may include a model processor 500, a first resource 600_1, and a second resource 600_2, and the model processor 500 may include an object candidate detector 510 and a task manager

520. Each of the first resource 600_1 and the second resource 600_2 may include a computation resource capable of performing object recognition and executing a task corresponding to an object recognition result. For example, the first resource 600_1 and the second resource 600_2 each may include various computation processing devices such as a CPU, a GPU, an AP, a DSP, an FPGA, an NPU, an ECU, an ISP, etc.

Operations of the model processor 500 of detecting a plurality of object candidates by analyzing the input image IMG, generating metadata of the plurality of object candidates, and setting a data processing order for the plurality of object candidates based on the metadata may be the same as or similar to the aforementioned embodiment and thus will not be repeatedly described.

The task manager 520 of the model processor 500 according to an example embodiment may allocate the plurality of object candidates to the first resource 600_1 or the second resource 600_2 by using the metadata of the plurality of object candidates.

In an example embodiment, the task manager 520 may determine an appropriate module (e.g., capable of, in executing a task, reducing the amount of computation, increasing a computational speed, or cutting down power consumption) between the first resource 600_1 and the second resource 600_2, by using metadata with respect to each of the plurality of object candidates. The task manager 520 may match each of the plurality of object candidates to the first resource 600_1 or the second resource 600_2, based on a determination result.

For example, the task manager 520 may allocate a first object candidate having a size of N×N that is a multiple of 32 to the first resource 600_1 that is an NPU and object candidates having other sizes to the second resource 600_2 that is a CPU or a GPU. The disclosure is not limited to the foregoing example, and the task manager 520 may allocate the plurality of object candidates to the first resource 600_1 and the second resource 600_2 according to various schemes.

According to a modifiable embodiment of the disclosure, the task manager 520 may allocate the plurality of object candidates to the first resource 600_1 and the second resource 600_2 by further considering an operation state of each of the first resource 600_1 and the second resource 600_2. The information about the operation state of a resource may include various information such as information indicating whether the resource performs data processing, information about a data processing target, information about ongoing data processing of the resource, etc.

In an example embodiment, the task manager 520 may receive information about an operation state of the first resource 600_1 from the first resource 600_1 and receive information about an operation state of the first resource 600_2 from the second resource 600_2 and allocate the plurality of object candidates to the first resource 600_1 and the second resource 600_2 by further considering the information about the operation state and the metadata of the plurality of object candidates. For example, when the task manager 520 determines based on the information about the operation state that the first resource 600_1 is in a standby state and the second resource 600_2 is performing data processing, the task manager 520 may allocate an object candidate having a preceding order to the first resource 600_1. A method of allocating the plurality of object candidates to the plurality of resources based on the information about the operation state in the neural network system according to the disclosure is not limited to the above-described example.

The model processor 500 may transmit information related to data processing of an object candidate of the plurality of object candidates to a module to which the object candidate is allocated according to a set order of the object candidate. For example, referring to FIG. 14, when the first object candidate OC1 is allocated to the first resource 600_1 and the second object candidate OC2 is allocated to the second resource 600_2, the model processor 500 may transmit the information Info_OC1 related to data processing of the first object candidate to the first resource 600_1 and the information Info_OC2 related to data processing of the second object candidate to the second resource 600_2.

The first resource 600_1 and the second resource 600_2 may perform object recognition with respect to the first object candidate OC1 and the second object candidate OC2, respectively, and execute a task corresponding to an object recognition result, by using the received information.

The neural network system 30 is illustrated as including the first resource 600_1 and the second resource 600_2 in FIG. 14, but the neural network system 30 may be implemented to include three or more resources.

As such, the neural network system according to an example embodiment may match the plurality of object candidates to the plurality of resources, based on the metadata or based on the metadata and operation states of the plurality of resources. Thus, the neural network system according to an example embodiment may reduce the amount of computation, increase the computation speed, and reduce power consumption, thereby performing efficient computation processing.

Figure 15:
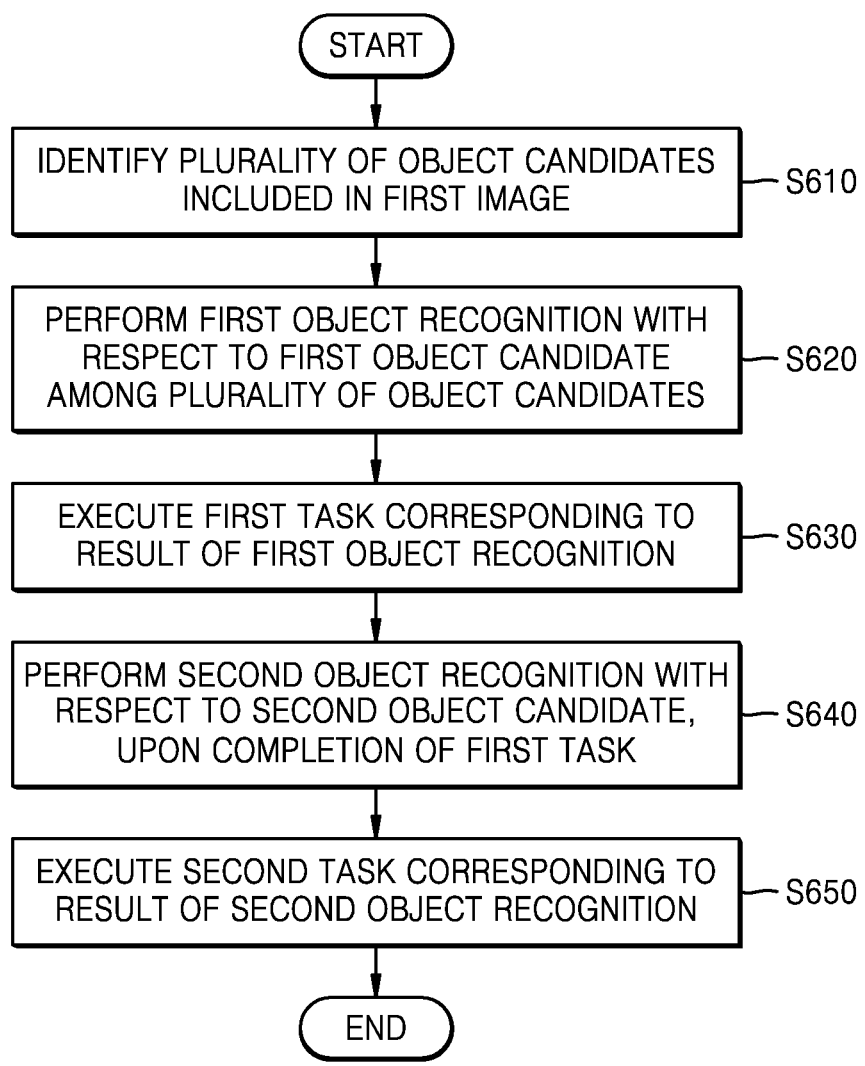
FIG. 15 is a flowchart illustrating an operating method of a neural network system, according to an example embodiment.

FIG. 15 is a flowchart illustrating an operating method of a neural network system, according to an example embodiment. More specifically, an operating method of a neural network system according to the current embodiment of the disclosure may include operations performed time-serially by the neural network systems 10, 20, and 30 of FIGS. 1, 2, 13, and 14.

Referring to FIG. 15, the neural network system may detect a plurality of object candidates included in the first image in operation S610. The object candidate may refer to a region where a probability of an object of interest being included in the first image is high. The object candidate may refer to an RoI. In an example embodiment, the neural network system may detect the plurality of object candidates included in the first image, by using the neural network model such as an RPN.

The neural network system may perform first object recognition with respect to a first object candidate corresponding to a first processing order among the plurality of object candidates. In an example embodiment, the neural network system may set a data processing order for the plurality of object candidates by using the metadata of the plurality of object candidates, and perform first object recognition with respect to the first object candidate selected based on the set data processing order.

More specifically, the neural network system may generate metadata of the plurality of object candidates based on the first image. The metadata may include information about a size, a position in the image IMG, a top left coordinate, a bottom-right coordinate, a distance from a preset coordinate or a preset region, a depth, etc., of each of the plurality of object candidates. The disclosure is not limited thereto, and a type of the metadata may include additional information as well as the above-described information.

The neural network system may calculate scores respectively indicating importances of the plurality of object candidates based on the generated metadata and arrange the calculated scores in a descending order. Based on a result of arrangement, the neural network system may set the data processing order for the plurality of object candidates. The neural network system may identify the first object candidate of the first order in the set data processing order and perform first object recognition with respect to the identified first object candidate.

The neural network system may execute a first task corresponding to a result of the first object recognition, in operation S630. For example, when the neural network system is applied to an autonomous driving vehicle and the first object candidate is recognized as an automobile, the neural network system may perform an operation of calculating a distance between the recognized automobile and the autonomous driving vehicle, as a task corresponding to the recognized automobile.

Upon completion of the first task, the neural network system may perform second object recognition with respect to the second object candidate. In an example embodiment, the neural network system may perform second object recognition with respect to the second object candidate having the next order. The neural network system may execute a second task corresponding to a result of the second object recognition, in operation S650.

The neural network system may repeatedly perform the above-described object recognition operation and an operation of executing a task corresponding to an object recognition result, with respect to the remaining object candidates.

An operating method of the neural network system according to the disclosure may perform object recognition in a unit of an object and execute a task corresponding to an object recognition result for a plurality of object candidates included in an image. Accordingly, the operating method of the neural network system according to the disclosure may prevent a bottleneck phenomenon caused by consecutive object recognition operations and preferentially perform data processing for an object candidate having a high importance.

Figure 16:
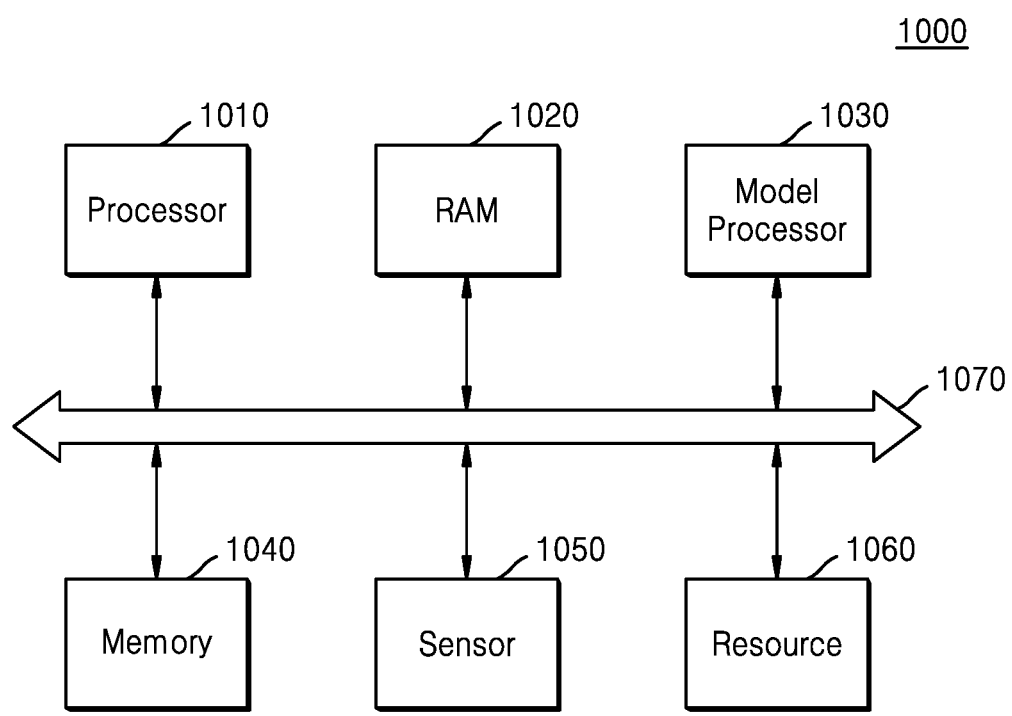
FIG. 16 is a block diagram of an electronic device, according to example embodiments.

FIG. 16 is a block diagram of an electronic device, according to example embodiments of the disclosure.

Referring to FIG. 16, an electronic device 1000 may include a processor 1010, a random access memory (RAM) 1020, a model processor 1030, a memory 1040, a sensor 1050, and a resource 1060, and the components of the electronic device 1000 may be connected to communicate with one another through a bus 1070. The model processor 1030 may correspond to any one of the model processors 100, 300, and 500 of the foregoing embodiments, and the resource 1060 may correspond to any one of the resources 200, 400, 600_1, and 600_2 of the foregoing embodiments. In some example embodiments of the disclosure, the model processor 1030 and the resource 1060 may be implemented by using one or more of the example embodiments described with reference to FIGS. 1 through 15.

The electronic device 1000 may extract effective information by analyzing input data in real time based on a neural network, and determine a situation based on the extracted information or control the components of an electronic device on which the electronic device 1000 is mounted. For example, the electronic device 1000 may be applied to a drone, a robotic apparatus such as an advanced drivers assistance system (ADAS), a smart television (TV), a smartphone, a medical device, a mobile device, an image display device, a measurement device, an Internet of Things (IoT) device, etc., and may be mounted on at least one of various types of electronic devices.

The processor 1010 may control overall operations of the electronic device 1000. For example, the processor 1010 may control a function of the model processor 1030, by executing programs stored in the RAM 1020. The RAM 1020 may temporarily store programs, data, an application, or instructions.

The sensor 1050 may sense or receive a signal (e.g., an image signal, a voice signal, a magnetic signal, a bio-signal, a touch signal, etc.) from outside the electronic device 1000 and convert the signal into data. According to an example embodiment, the sensor 1050 may include an image sensor that receives an image signal corresponding to a surrounding of the electronic device 1000 and converts the image signal into data in an image form. The electronic device 1000 may include a plurality of sensors 1050.

The model processor 1030 may perform computation of a neural network and generate an information signal based on an execution result, by controlling the resource 1060. In an example, the model processor 1030 may be implemented with software stored in a system memory (e.g., a read only memory (ROM)) or may operate based on control of the processor 1010. The memory 1040, which is a storage for storing data, may store various data generated by computation operation of the model processor 1030 and the resource 1060.

According to an example embodiment, the model processor 1030 may receive the image from the sensor 1050 and detect the plurality of object candidates included in the received image. The model processor 1030 may generate metadata of the detected plurality of object candidates and set a data processing order for the plurality of object candidates based on the generated metadata. The model processor 1030 may sequentially provide the information related to data processing of the plurality of object candidates OC1 through OCn to the resource 1060 according to the set data processing order.

The resource 1060 may include a computation resource for executing multiple computations based on a neural network or a communication resource implemented with various wired or wireless interfaces capable of communicating with an external device. According to an example embodiment, the resource 1060 may sequentially perform data processing with respect to the plurality of object candidates in the unit of an object, in an order in which information related to data processing of the plurality of object candidates is received from the model processor 1030. According to an example embodiment, the resource 1060 may include a plurality of resources that are homogeneous or heterogeneous.

Thus, the electronic device 1000 according to the disclosure preferentially processes data processing with respect to an object candidate determined as having a high importance, thereby performing fine-grained control using an object recognition technique.

Figure 17:
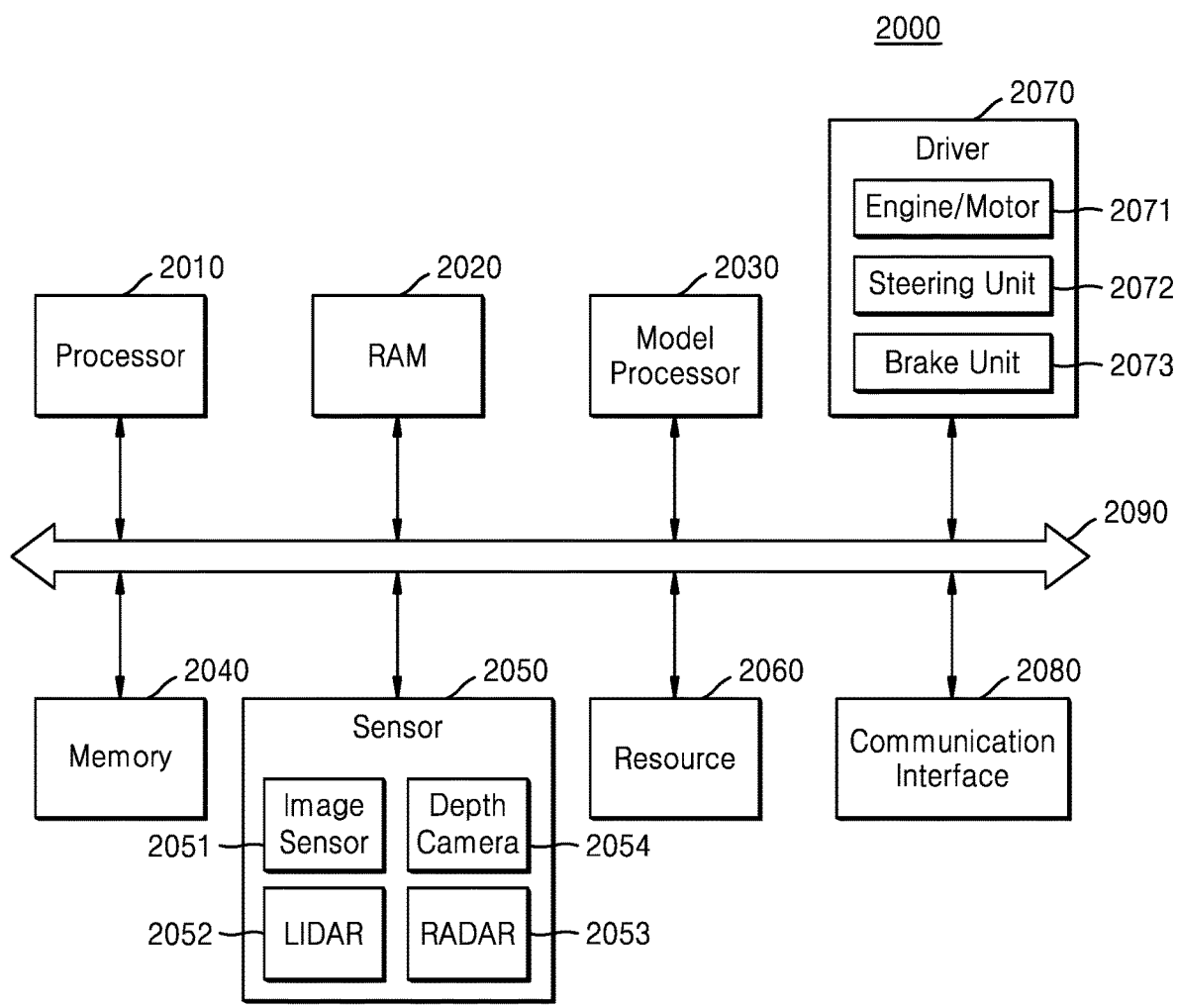
FIG. 17 is a block diagram of an autonomous driving device, according to an example embodiment.

FIG. 17 is a block diagram of an autonomous driving device, according to an example embodiment.

Referring to FIG. 17, an autonomous driving device 2000 may include a processor 2010, an RAM 2020, a model processor 2030, a memory 2040, a sensor 2050, a resource 2060, a driver 2070, and a communication interface 2080, and the components of the autonomous driving device 2000 may be connected to communicate with one another through a bus 2090. The model processor 2030 may correspond to the model processors 100, 300, 500, and 1030 of the foregoing embodiments, and the resource 2060 may correspond to the resources 200, 400, 600_1, 600_2, and 1060 of the foregoing embodiments. In some example embodiments of the disclosure, the model processor 2030 and the resource 2060 may be implemented using the example embodiments described with reference to FIGS. 1 through 16.

The autonomous driving device 2000 may determine a situation and control vehicle driving by analyzing in real time data of an environment surrounding the autonomous driving vehicle based on the neural network.

The processor 2010 may control overall operations of the autonomous driving device 2000. For example, the processor 2010 may control a function of the model processor 2030, by executing programs stored in the RAM 2020. The RAM 2020 may temporarily store programs, data, an application, or instructions.

The sensor 2050 may include multiple sensors that receive an image signal regarding a surrounding environment of the autonomous driving device 2000 and output the image signal as an image. For example, the sensor 2050 may include an image sensor 2051 such as a charge coupled device (CCD) or a complementary metal oxide semiconductor (CMOS), a light detection and ranging (LiDAR) sensor 2052, a radio detecting and ranging (Radar) sensor 2053, a depth camera 2054, etc. The disclosure is not limited thereto, and the sensor 2050 may further include an ultrasonic sensor (not shown), an infrared sensor (not shown), etc.

The model processor 2030 may perform computation of a neural network and generate an information signal based on an execution result, by controlling the resource 2060. The memory 2040, which is a storage for storing data, may store various data generated by computation of the model processor 2030 and the resource 2060.

According to an example embodiment, the model processor 2030 may receive an image captured by photographing the surrounding environment of the autonomous driving device 2000 from the sensor 2050 and detect the plurality of object candidates included in the received image. The model processor 2030 may generate metadata of the detected plurality of object candidates and set a data processing order for the plurality of object candidates based on the generated metadata. The model processor 2030 may sequentially provide the information related to data processing of the plurality of object candidates to the resource 2060 according to the set data processing order.

The resource 2060 may include a computation resource for executing multiple computations based on a neural network or a communication resource implemented with various wired or wireless interfaces capable of communicating with an external device. According to an example embodiment, the resource 2060 may sequentially perform data processing with respect to the plurality of object candidates in the unit of an object, in an order in which information related to data processing of the plurality of object candidates is received from the model processor 2030. According to an example embodiment, the resource 2060 may include a plurality of resources that are homogeneous or heterogeneous.

The driver 2070 may include, as components for driving the autonomous driving device 2000, an engine and a motor 2071, a steering unit 2072, and a brake unit 2073. In an example embodiment, the driver 2070 may adjust propulsion, braking, speed, direction, etc., of the autonomous driving device 2000 by using the engine and motor 2071, the steering unit 2072, and the brake unit 2073, under control of the processor 2010.

The communication interface 2080 may communicate with the external device by using wired or wireless communication. For example, the communication interface 2080 may perform communication by using a wired communication scheme such as Ethernet or perform communication by using a wireless communication scheme such as wireless fidelity (WiFi) or Bluetooth.

The resource 2060 generate information based on a result of performing data processing with respect to an object candidate, and the processor 2010 may generate a control command for controlling the autonomous driving device 2000 by using the information generated by the resource 2060. For example, the resource 2060 may recognize fire as an object included in an image output from the sensor 2050 and generate information about an emergency service number '119' as a task corresponding fire. Thus, the processor 2010 may control the communication interface 2080 to call the emergency service number '119'. In another example, the resource 2060 may recognize fire and execute a task of changing a driving route of the autonomous driving device 2000 as the task corresponding to fire. Then, the processor 2010 may control the driver 2070 to drive according to the changed autonomous driving.

The method according to the example embodiments described herein may be recorded in a non-transitory computer-readable medium including program instructions to implement various operations embodied by a computer. The medium may also include, alone or in combination, the program instructions, data files, data structures, and the like. The program instructions recorded on the medium may be those specially designed and constructed for the purposes embodied herein, or may be known to those having ordinary skill in the relevant art. Examples of non-transitory computer-readable medium include a magnetic medium such as a hard disk, a floppy disk, and a magnetic tape; an optical medium such as a compact disc (CD) a read-only memory (ROM) and a digital versatile disk (DVD); a magneto-optical medium such as a floptical disc; and hardware devices that are specially configured to store and perform program instructions, such as a ROM, a random access memory (RAM), a flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. A neural network system, comprising:
   a processor configured to detect a plurality of object candidates included in a first image, generate metadata corresponding to the plurality of object candidates based on the first image, and set data processing orders of the plurality of object candidates based on the metadata; and
   at least one resource configured to perform data processing with respect to the plurality of object candidates,
   wherein the processor is further configured to sequentially provide pieces of information related to data processing of the plurality of object candidates to the at least one resource according to the set data processing orders of the plurality of object candidates,
   wherein the at least one resource is further configured to sequentially perform data processing with respect to the plurality of object candidates according to an order in which a piece of information related to data processing of each of the plurality of object candidates is received,
   wherein the at least one resource is further configured to perform first object recognition with respect to a first object candidate of a first order, and execute a first task corresponding to a result of the first object recognition, the first task being related to an operation of generating a control command for controlling a device to which the neural network system is applied, and
   wherein the processor is further configured to, based on completion of the first task, provide a piece of information related to data processing of a second object candidate of a next order to the first order, among the plurality of object candidates, to the at least one resource.

2. The neural network system of claim 1, wherein the at least one resource is further configured to:
   based on receiving the piece of information related to data processing of the second object candidate, perform second object recognition with respect to the second object candidate, and execute a second task corresponding to a result of the second object recognition.

3. The neural network system of claim 2, wherein the processor is further configured to determine a plurality of regions of interest (RoIs) of the first image and detect the plurality of RoIs as the plurality of object candidates.

4. The neural network system of claim 1, wherein the processor is further configured to obtain scores of the plurality of object candidates according to one or more criteria based on the metadata, and set the data processing orders of the plurality of object candidates by using the obtained scores.

5. The neural network system of claim 4, wherein the processor is further configured to set the data processing orders of the plurality of object candidates according to magnitudes of score values of the plurality of object candidates.

6. The neural network system of claim 4, wherein the processor is further configured to identify an object candidate having a score value greater then a first threshold and immediately provide information related to data processing of the object candidate to the at least one resource.

7. The neural network system of claim 4, wherein the processor is further configured to identify an object candidate having a score value less than a second threshold and not set a data processing order of the identified object candidate.

8. The neural network system of claim 1, wherein the metadata comprises information of at least one of a size, a position in the first image, a top left coordinate, a bottom right coordinate, a distance from a preset coordinate, or a depth of each of the plurality of object candidates.

9. The neural network system of claim 1, wherein the processor is further configured to set the data processing orders of the plurality of object candidates further based on metadata of the plurality of object candidates included in a second image that is a previous frame of the first image.

10. The neural network system of claim 1, wherein the at least one resource comprises a plurality of resources, and
    wherein the processor is further configured to match the plurality of object candidates to the plurality of resources, based on the metadata corresponding to the plurality of object candidates, and respectively provide the pieces of information related to data processing of the plurality of object candidates to the plurality of resources, based on a matching result.

11. The neural network system of claim 10, wherein the processor is further configured to identify operation states of the plurality of resources and match the plurality of object candidates to the plurality of resources further based on the identified operation states.

12. The neural network system of claim 1, wherein the at least one resource comprises a plurality of task processing modules, and
    wherein the at least one resource is further configured to match the plurality of task processing modules to the plurality of object candidates, based on the metadata corresponding to the plurality of object candidates, and respectively provide the pieces of information related to data processing of the plurality of object candidates to the plurality of task processing modules, based on a matching result.

13. An operating method of a neural network system, the operating method comprising:
    detecting a plurality of object candidates included in a first image;
    performing first object recognition with respect to a first object candidate of a first order among the plurality of object candidates;
    executing a first task corresponding to a result of the first object recognition, the first task being related to an operation of generating a control command for controlling a device to which the neural network system is applied;
    performing second object recognition with respect to a second object candidate of a next order to the first order, among the plurality of object candidates, upon completion of the first task; and executing a second task corresponding to a result of the second object recognition.

14. The operating method of claim 13, further comprising:
generating metadata corresponding to the plurality of object candidates, based on the first image;
selecting the first object candidate among the plurality of object candidates, based on the metadata; and
selecting the second object candidate, among remaining object candidates excluding the first object candidate, based on the metadata.

15. The operating method of claim 14, wherein the selecting the first object candidate based on the metadata comprises:
obtaining scores of the plurality of object candidates according to one or more criteria, based on the metadata; and
selecting the first object candidate based on the obtained scores.

16. The operating method of claim 15, wherein the selecting the first object candidate based on the metadata comprises selecting an object candidate having a score value greater than a threshold among the obtained scores, as the first object candidate.

17. The operating method of claim 15, wherein the selecting the first object candidate based on the metadata comprises selecting an object candidate having a largest score value among the plurality of object candidates as the first object candidate.

18. The operating method of claim 15, wherein the selecting the second object candidate comprises selecting an object candidate having a largest score value, among the remaining object candidates excluding the first object candidate, as the second object candidate.

19. An electronic device, comprising:
a sensor configured to obtain data about a vicinity of the electronic device and output a first image based on the obtained data;
at least one resource configured to perform object recognition with respect to the first image;
a memory configured to store programs; and
a processor configured to read the programs and operate as instructed by the programs, to detect a plurality of object candidates in the first image, generate metadata of the plurality of object candidates based on the first image, and provide, to the at least one resource, information about a first object candidate, that is selected based on the metadata among the plurality of object candidates,
wherein the at least one resource is further configured to perform first object recognition with respect to the first object candidate of a first order and execute a first task corresponding to a result of the first object recognition, the first task being related to an operation of generating a control command for controlling the electronic device, and
wherein the processor is further configured to, based on completion of the first task, provide information about a second object candidate of a next order to the first order, among the plurality of object candidates, to the at least one resource.

20. The electronic device of claim 19, wherein
the at least one resource is further configured to, based on receiving the information about the second object candidate, perform second object recognition with respect to the second object candidate and execute a second task corresponding to a result of the second object recognition.

* * * * *